(12) United States Patent
Sako et al.

(10) Patent No.: US 7,406,177 B2
(45) Date of Patent: Jul. 29, 2008

(54) RECORDING MEDIUM, RECORDING METHOD, RECORDING APPARATUS, AND REPRODUCTION METHOD

(75) Inventors: Yoichiro Sako, Tokyo (JP); Shunsuke Furukawa, Tokyo (JP); Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 883 days.

(21) Appl. No.: 10/468,786

(22) PCT Filed: Dec. 19, 2002

(86) PCT No.: PCT/JP02/13300

§ 371 (c)(1),
(2), (4) Date: Aug. 21, 2003

(87) PCT Pub. No.: WO03/054881

PCT Pub. Date: Jul. 3, 2003

(65) Prior Publication Data

US 2004/0096189 A1 May 20, 2004

(30) Foreign Application Priority Data

Dec. 21, 2001 (JP) .............................. 2001-389749

(51) Int. Cl.
*H04N 7/167* (2006.01)
*G11B 19/02* (2006.01)

(52) U.S. Cl. ..................................... 380/201; 369/47.12
(58) Field of Classification Search ....................... None
See application file for complete search history.

(56) References Cited

U.S. PATENT DOCUMENTS 6,289,102 B1 * 9/2001 Ueda et al. .................. 380/201
2001/0017828 A1 * 8/2001 Yamada .................... 369/47.12

FOREIGN PATENT DOCUMENTS

| JP | 4-163768 | 6/1992 |
| JP | 9-171481 | 6/1997 |
| JP | 11-288555 | 10/1999 |
| JP | 11-296984 | 10/1999 |
| JP | 2000-196585 | 7/2000 |

* cited by examiner

*Primary Examiner*—Nasser Moazzami
*Assistant Examiner*—Brandon S Hoffman
(74) *Attorney, Agent, or Firm*—Oblon, Spivak, McClelland, Maier & Neustadt, P.C.

(57) ABSTRACT

A recording medium, comprising a lead-in area, a data recording area that is formed on an outer periphery side of the lead-in area and in which a plurality of pieces of content data is recorded, and a lead-out area formed on an outer periphery side of the data recording area, wherein first copyright management information and second copyright management information with which copyrights of the plurality of pieces of content data are managed are recorded at different positions whose secrecies are different from each other.

47 Claims, 19 Drawing Sheets

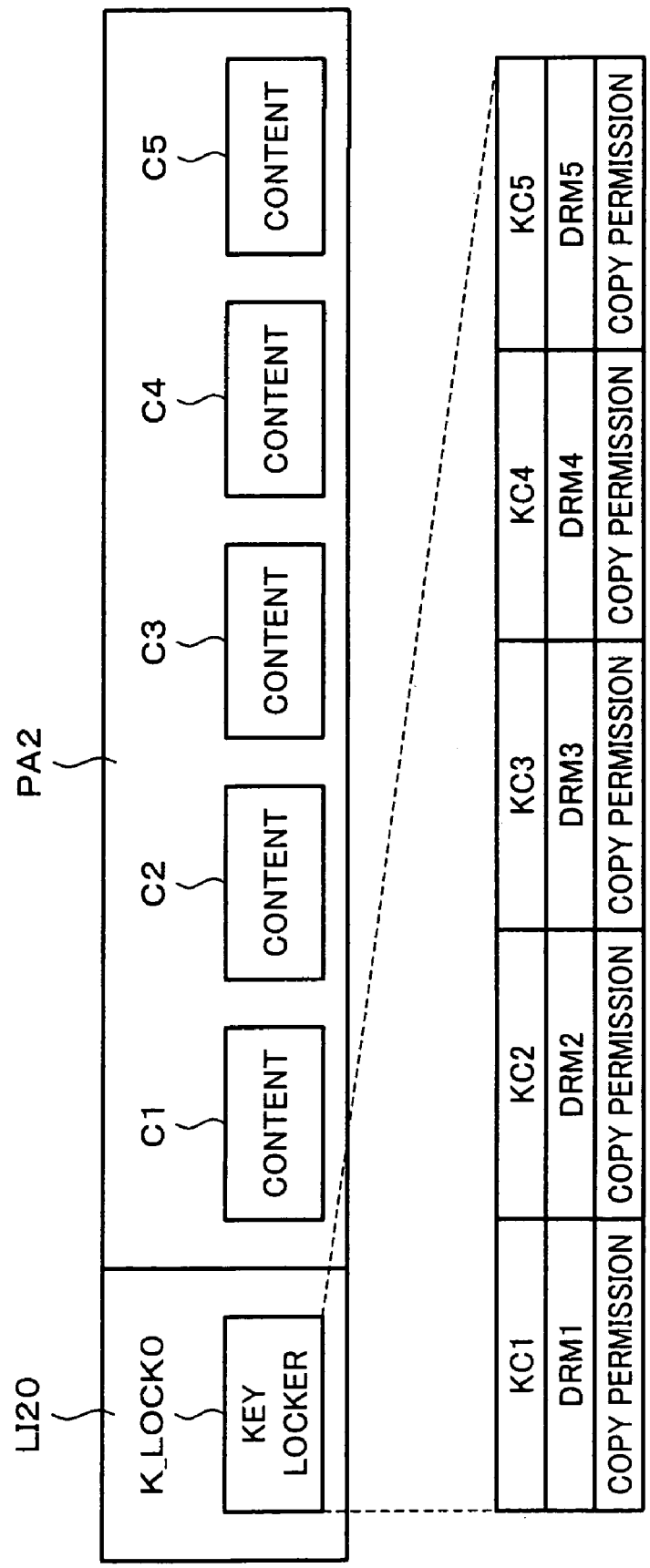

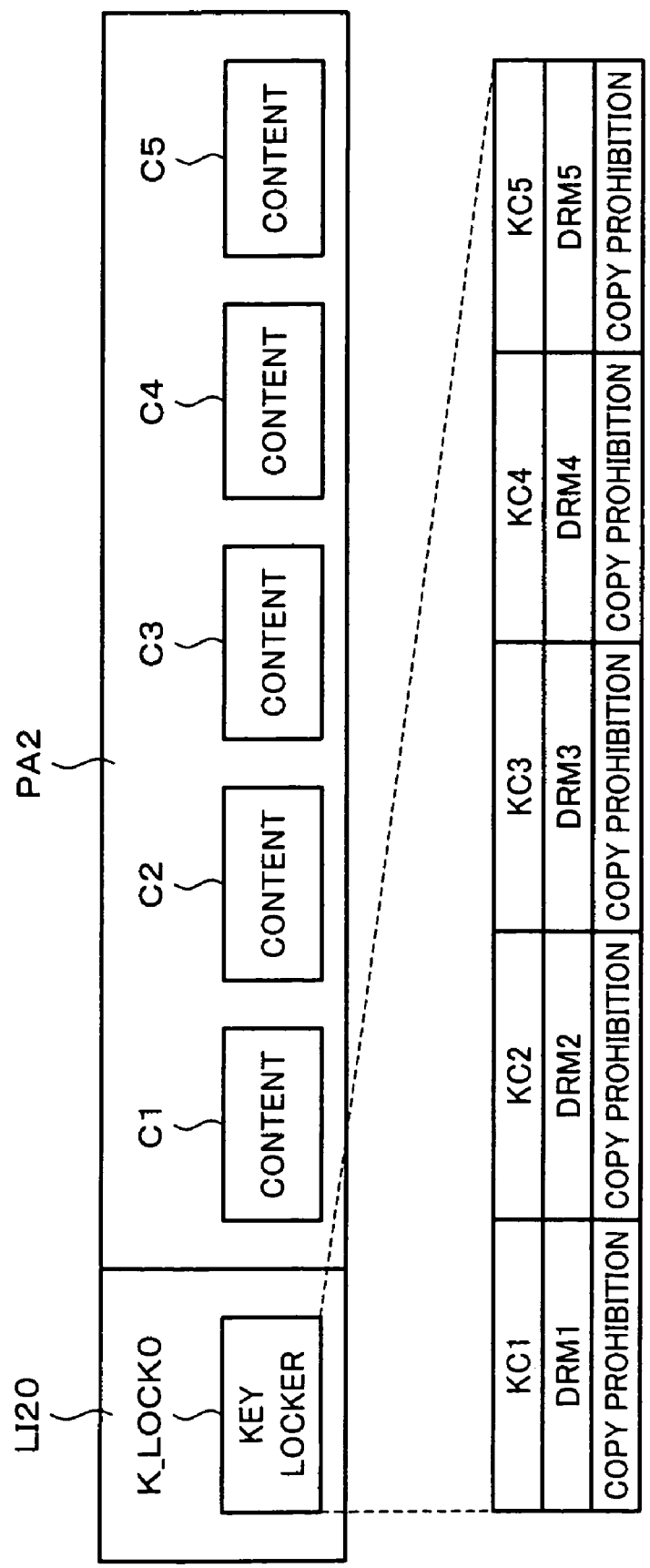

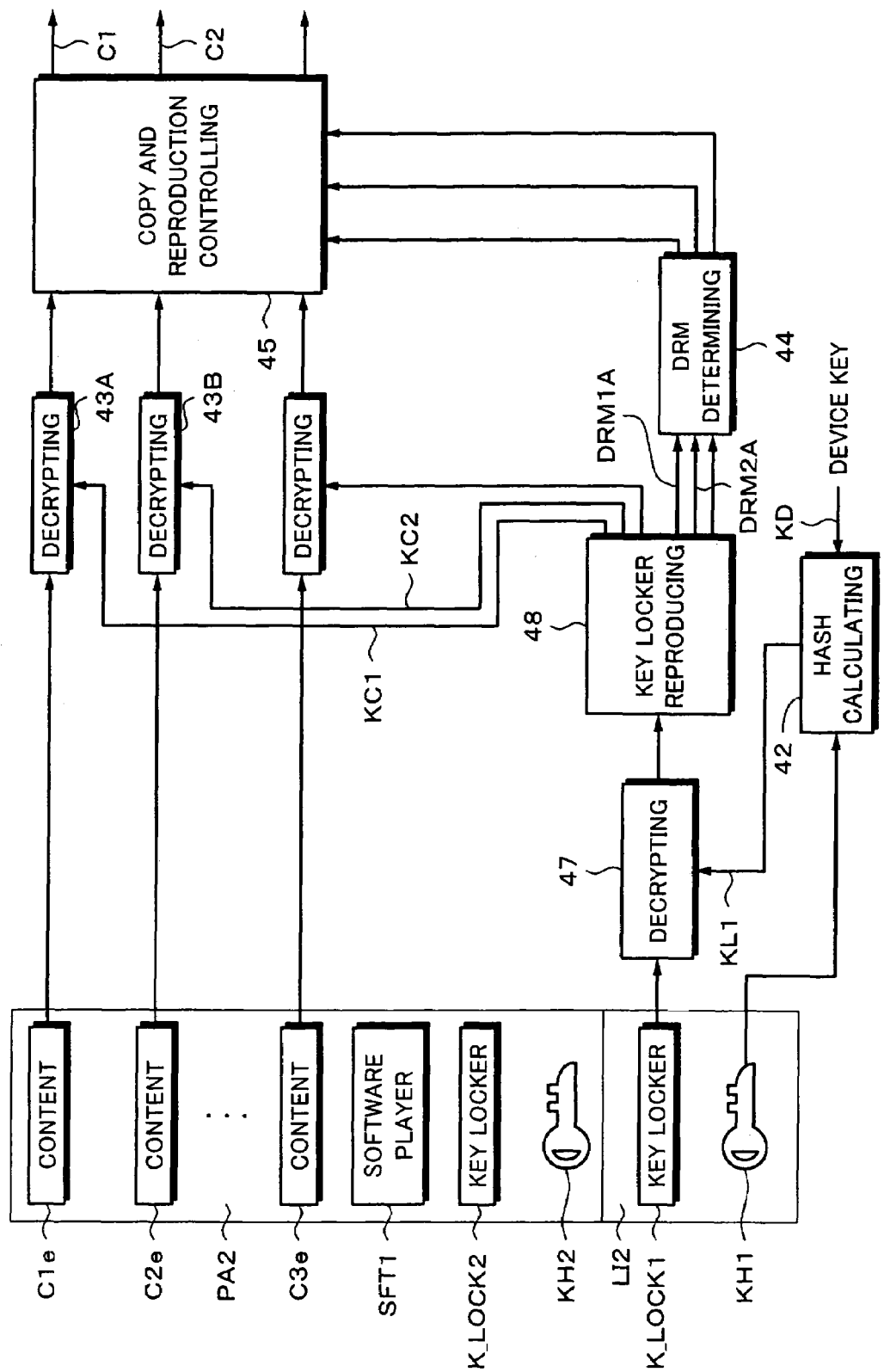

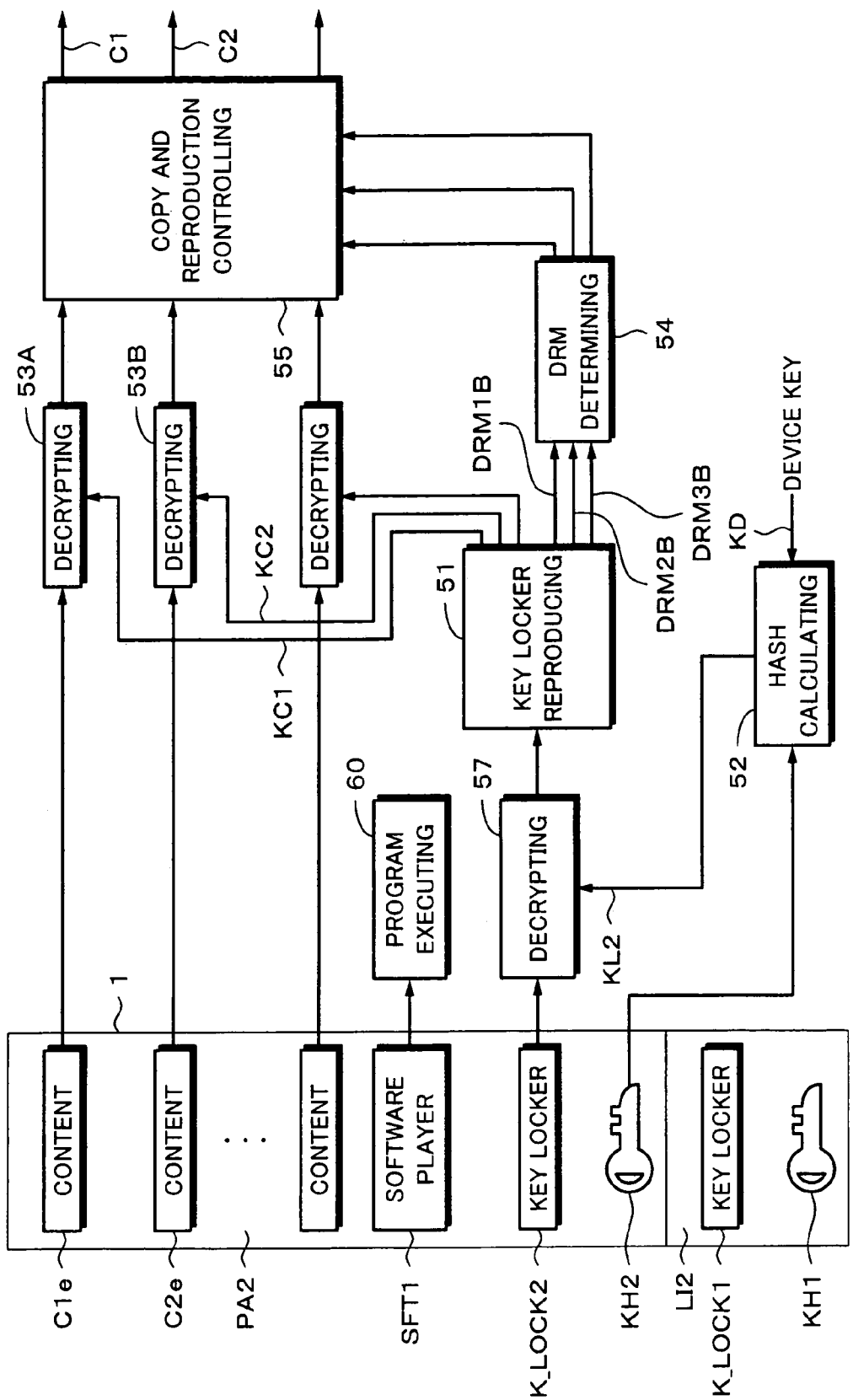

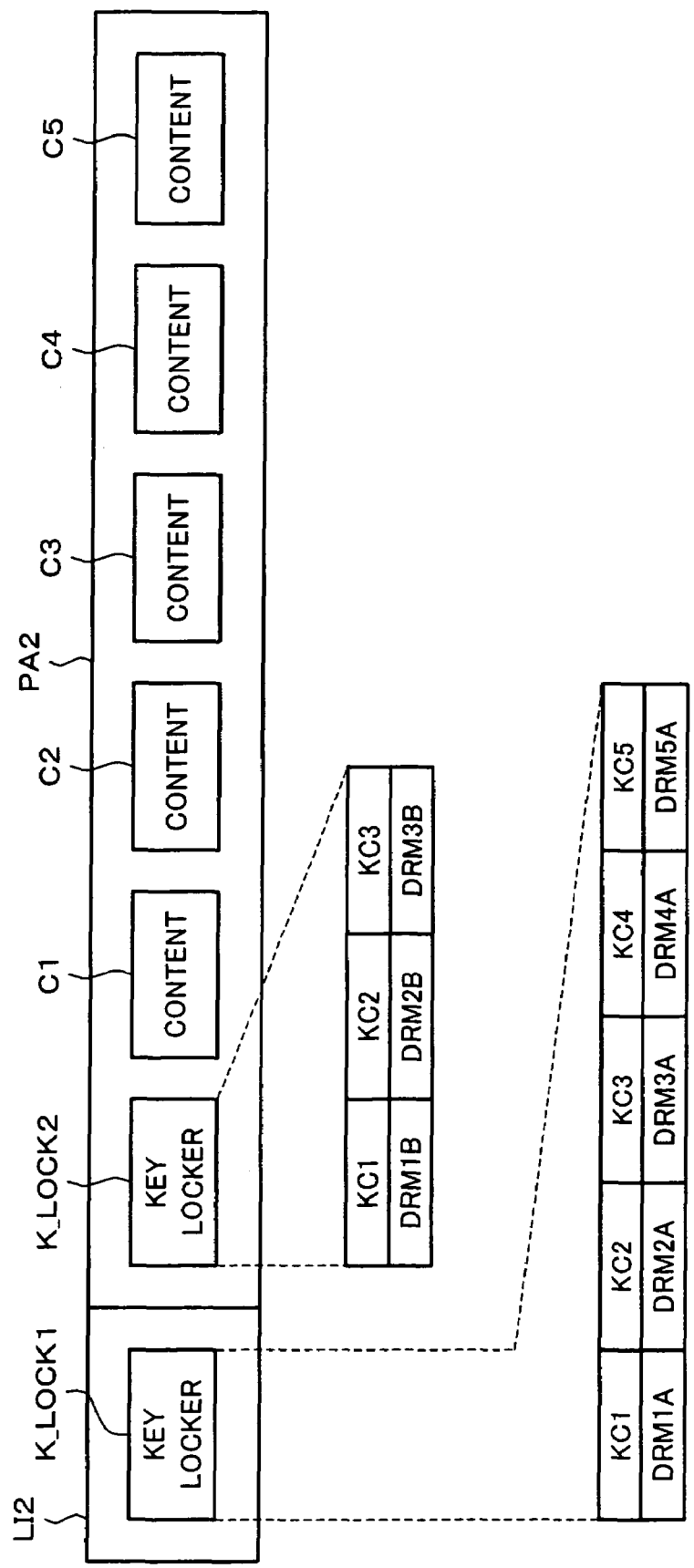

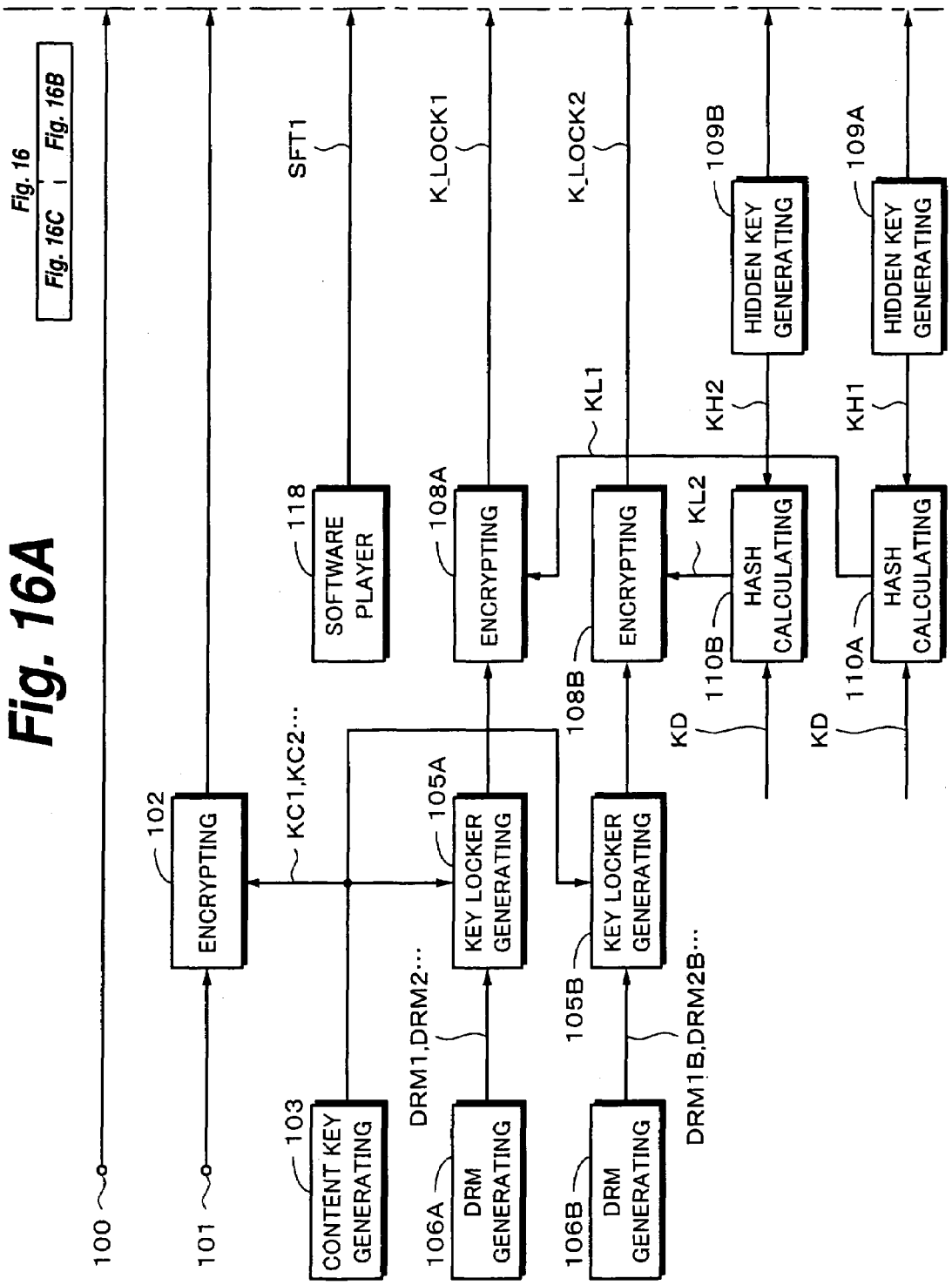

RECORDING MEDIUM, RECORDING METHOD, RECORDING APPARATUS, AND REPRODUCTION METHOD

BACKGROUND OF THE INVENTION

1. Field of the Invention

The present invention relates to a recording medium for recording content data, a recording method and an apparatus for recording content data, and a reproducing method for reproducing content data, in particular to those that allow a conventional reproducing apparatus to reproduce content data and copyright of content data to be protected.

2. Description of Related Art

A new type optical disc from which a conventional CD-DA (Compact Disc Digital Audio) player and a CD-ROM (Compact Disc Read Only Memory) can reproduce data and that has a compatibility with a computer has been developed. In the new type optical disc, content data is encrypted and recorded so as to protect the copyright thereof. It is considered that key information for encrypted content data will be recorded in a lead-in region.

In other words, when content data is encrypted and recorded, there is a problem about the position of the key information. To safely manage key information, it is preferred to store it at a position the user cannot easily access. Thus, when video data is recorded to for example a DVD (Digital Versatile Disc), key information is recorded in a read-in area and encrypted data is recorded in a program area. Thus, in such a new type optical disc, to prevent the user from easily accessing key information, it is considered that the key information is recorded in the lead-in area.

In the case of the DVD, since it has been developed on condition that content data is encrypted to protect the copyright it. Thus, when key information is recorded in the lead-in area, no considerable problem occurs. However, in the case of such a new type optical disc, if key information were recorded in a lead-in area, the conventional player and drive, which cannot deal with the new type optical disc, could not reproduce content data.

In other words, the conventional CD-DA disc and CD-ROM disc have not been developed on condition that encrypted content data is recorded. Thus, the conventional player and drive do not have a function for decrypting encrypted content data. When encrypted data that is read from the new type optical disc is decrypted by the conventional player and drive, it is considered that a decrypting process for content data is performed by software.

However, while the conventional player and driver are reproducing content data from an optical disc, the lead-in area cannot be accessed by the software. In other words, in the CD-ROM standard, the disc is accessed sector by sector, each of which is composed of 98 frames. While the conventional player and drive are reproducing content data, they access the disc sector by sector. Thus, the conventional player and drive cannot access the lead-in area. Consequently, when key information is recorded in the lead-in areas, since the conventional player and drive, which cannot deal with such the new type optical disc, cannot access the key information, they cannot decrypt content data.

A player and a drive that can deal with the new type optical disc will be released after it is decided that key information is recorded in the lead-in area. The player and drive will be designed so that they access the lead-in area, obtain key information, and decrypt encrypted content data with the obtained key information. Thus, when the player and drive that can deal with the new type optical disc become common, the problem of the conventional player and drive that cannot access key information in the lead-in area and reproduce content data will be solved.

In a transitional period until the player and drive that can deal with the new type optical disc become common, the conventional player and drive, which cannot deal with the new type optical disc, reads encrypted content data from the new type optical disc and decrypts the encrypted content data. In such a transitional period, however, since the key information in the lead-in area cannot be accessed, there will be a problem of which encrypted content data cannot be decrypted.

To solve such a problem, it is considered that key information is recorded in a program area so that the conventional drive and player, which cannot deal with the new type optical disc, can decrypt content data.

However, the secrecy of key information recorded in the program area is lower than that recorded in the lead-in area. Thus, when key information is recorded in the program area, although the conventional drive and player, which cannot deal with the new type optical disc, can decrypt content data, the key information recorded in the program area is illegally taken out. As a result, it is considered that since the content data will be illegally reproduced and copied, the copyright thereof cannot be protected.

Therefore, an object of the present invention is to provide a recording medium, a recording method and apparatus, and a reproducing method that allow a reproducing apparatus that cannot deal with encrypted content data to decrypt encrypted content data and that the copyright thereof to be securely protected.

BRIEF SUMMARY OF THE INVENTION

The present invention is a data recording medium on which a plurality of pieces of content data are recoded in a program area, two types of copyright management information that are first and second copyright management information for managing copyrights of the plurality of pieces of content data being recorded at different positions whose secrecies are different from each other.

The present invention is a data recording method, comprising steps of recording a plurality of pieces of content data in a program area of a data recording medium, and recording two types of copyright management information that are first and second copyright management information at different positions whose secrecies are different from each other.

The present invention is a data recording apparatus comprising means for recording a plurality of pieces of content data in a program area of a data recording medium, and means for recording two types of copyright management information that are first and second copyright management information at different positions whose secrecies are different from each other.

The present invention is a data recording medium on which a plurality of pieces of content data are encrypted and recorded in a program area, at least two types of key information that are first and second key information being recorded at different positions whose secrecies are different from each other.

The present invention is a data recording method, comprising the steps of encrypting a plurality of pieces of content data and recording the encrypted plurality of pieces of content data to a program area of a data recording medium and recording at least two types of key information that are first and second key information at different positions whose secrecies are different from each other.

The present invention is a data recoding apparatus comprising means for encrypting a plurality of pieces of content data and recording the encrypted plurality of pieces of content data to a program area of a data recording medium and means for recording at least two types of key information that are first and second key information at different positions whose secrecies are different from each other.

BRIEF DESCRIPTION OF THE DRAWINGS

FIG. 9 is a schematic diagram for describing a key locker of the optical disc;

FIG. 10 is a schematic diagram for describing a key locker of the optical disc;

FIG. 12 is a block diagram for describing a decrypting process for the optical disc according to an example of the present invention;

FIG. 13 is a block diagram for describing a decrypting process for the optical disc according to an example of the present invention;

FIG. 14 is a block diagram for describing a key locker of the optical disc according to an example of the present invention;

FIG. 16A and FIG. 16B are a block diagram of an example of an optical disc recoding apparatus according to an example of the present invention;

DETAILED DESCRIPTION OF THE INVENTION

Figure 1:
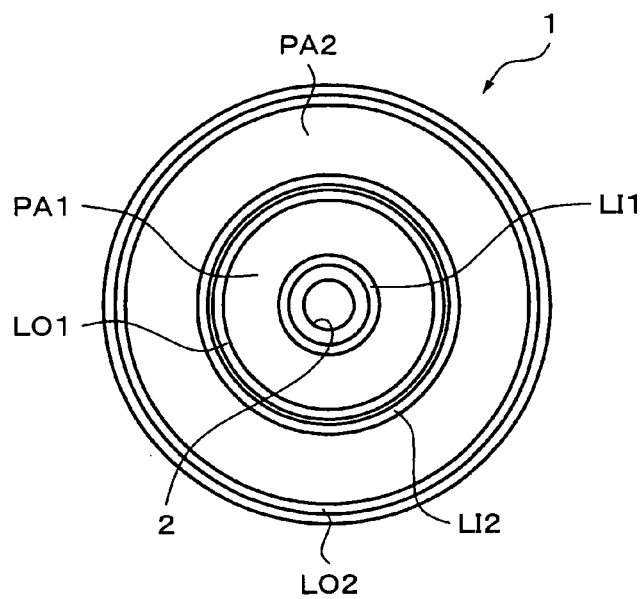
FIG. 1 is a plan view for describing an example of an optical disc according to an example of the present invention.
Figure 2:
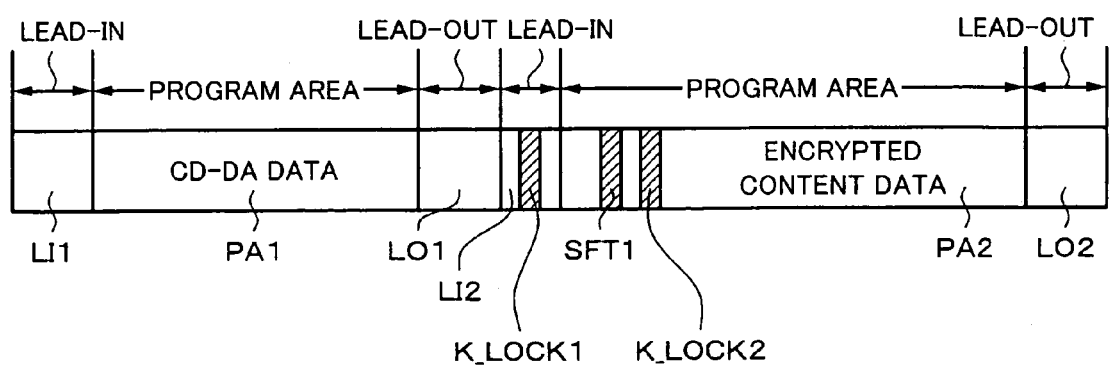
FIG. 2 is a schematic diagram for describing an example of the optical disc according to an example of the present invention.

Next, with reference to the accompanying drawings, an embodiment of the present invention will be described. FIG. 1 and FIG. 2 show a structure of an optical disc according to the present invention. The diameter of the optical disc 1 according to the present invention is 120 mm. A hole 2 is formed at the center of the optical disc 1. The physical shape of the optical disc 1 is the same as that of the conventional CD.

There is another optical disc 1 having a diameter of 80 mm, which is referred to as CD single.

In addition, there are three types of optical discs 1 categorized as reproduction only type optical disc, write once type optical disc, and recordable type optical disc.

In the reproduction only type optical disc 1, a recording layer is made of aluminum. In the reproduction only type optical disc 1, information is recorded as physical pits. Normally, such a disc is produced by a stamper.

In the write once type optical disc 1, a recording layer is made of an organic coloring matter such as phthalocyanine or cyanine. In the write once type optical disc, when data is written, the temperature of the recording layer made of an organic coloring matter on the disc is raised by laser light. As a result, the recording layer made of the coloring matter is thermally deformed.

In the rewritable type optical disc 1, a recording layer is made of a phase change material. The phase change material is for example an alloy of Ag—In—Sb—Te (silver-indium-antimony-tellurium) is used. Such a phase change material has a crystal phase and an amorphous phase. When the output level of the laser light is high, namely the intensity of the laser light is high, the temperature of the recording layer made of the phase change material is raised over the melting point and then quickly cooled. As a result, the recording layer becomes an amorphous state. When the output level of the laser light is low, namely the intensity of the laser light is relatively low, the temperature of the recording layer made of the phase change material is raised and then gradually cooled. As a result, the recording layer becomes a crystal state.

As shown in FIG. 2, a first lead-in area LI1 is formed on the innermost periphery of the optical disc. On the outer periphery of the lead-in area LI1, a first program area PA1 is formed. On the outer periphery of the first program area PA1, a first lead-out area LO1 is formed. In the first program area PA1, audio content data is recorded in the same recording format as the CD-DA (Compact Disc Digital Audio) standard.

Outside the first lead-out area LO1, a second lead-in area LI2 is formed. On the outer periphery of the lead-in area LI2, a second program area PA2 is formed. Outside the second program area PA2, a second lead-out area is formed. In the second program area LO2, audio data that has been compressed corresponding to for example ATRAC3 compressing system is encrypted and recorded as content data.

Content key data with which encrypted content data in the second program area PA2 is decrypted is contained in first key locker data K_LOCK1 and recorded in the second lead-in area LI2.

To allow the conventional drive, which cannot deal with the optical disc 1 to decrypt encrypted content data, content key data with which encrypted content data in the second program area PA2 is decrypted is contained in second key locker data K_LOCK2 and recorded in the program area PA2.

In addition, application data of a software player SFT1 that is a decryption process program for decrypting encrypted content data recorded in the program area PA2 is recorded in the program area PA2.

The key locker data K_LOCK1 and K_LOCK2 are data of which content key data has been encoded and encrypted. The key locker data K_LOCK1 and K_LOCK2 also contain copyright management information DRM (Digital Rights Management).

Key locker data is data of which a plurality of pieces of content key data are encoded and encrypted. Since a plurality of pieces of content key data which have been encoded and encrypted can be treated as a real locker that stores a plurality of content keys. Thus, they are referred to as key locker data.

In addition, copyright management information DRM with which copyright managements such as reproduction restrictions and copy restrictions of individual pieces of content data are performed can be contained in the key locker data. With the copyright management information DRM, for example "only reproduction" and "reproduction and copy permitted" can be designated. In addition, "copy restrictions", the number of copies in the copy restrictions such as "one copy", "five copies", and so forth can be designated. In addition, it is considered that "net distribution or distributed data copy permitted" is designated.

Figure 3:
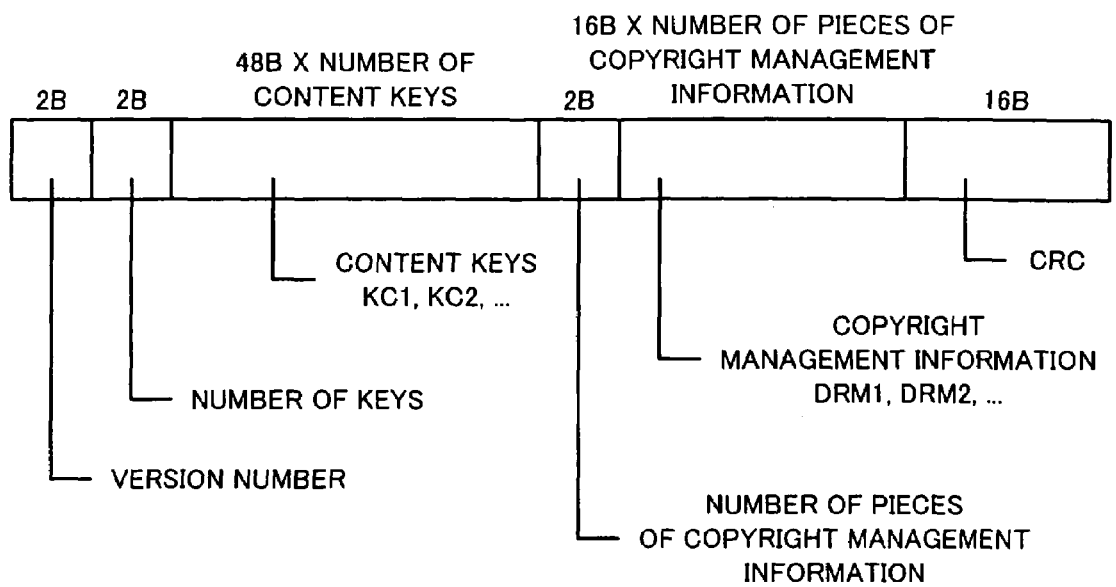
FIG. 3 is a schematic diagram for describing a key locker.

FIG. 3 is an example of the structure of a key locker portion. As shown in FIG. 3, at the beginning of the key locker portion, a data portion that represents a version number is formed. Next, a data portion that represents the number of pieces of content key data is formed. Next, content key data KC1, KC2, . . . corresponding to the number of pieces of the content key data are formed. The content key data KC1, KC2, . . . are composed of for example of 48 bytes each. Next, a data portion that represents the number of pieces of the copyright management information is formed. Next, copyright management information DRM1, DRM2, . . . corresponding to the number of pieces that the data portion represents are formed. The copyright management information DRM1, DRM2 . . . are composed of 16 bytes each. Next, a CRC (Cyclic Redundancy Check) code with which an error of 16 bytes is detected is added. The structure of the key locker data shown in FIG. 3 is just an example. Thus, the key locker data may have another structure.

The format of the key locker data K_LOCK1 recorded in the lead-in area LI2 is different from the format of the key locker data K_LOCK2 recorded in the program area PA2. In other words, the key locker data K_LOCK1 in the high secrecy lead-in area LI2 has higher added values than the key locker data K_LOCK2 in the low secrecy program area.

Thus, as shown in FIG. 2, in the optical disc 1 according to the present invention, the first key locker data K_LOCK1 is recorded in the lead-in area LI2 and the second key locker data K_LOCK2 is recorded in the program area PA2.

When the player and drive that can deal with the optical disc 1 and that will be released in near future reproduce content data from the optical disc 1, they access the lead-in area LI2 and read data from the first key locker data K_LOCK1. The first key locker data K_LOCK1 contains content key data KC1, KC2, . . . with which individual pieces of encrypted content data recorded in the program area PA2 of the optical disc 1 are decrypted. By taking out the content key data KC1, KC2, . . . from the key locker data K_LOCK1, the encrypted content data in the program area PA2 can be decrypted.

By performing a software process for accessing the program area PA2, the conventional player and drive, which cannot deal with the optical disc 1, can read data from the second key locker data K_LOCK2. In other words, the player and drive can take out the content key data KC1, KC2, . . . from the second key locker data and perform a decrypting process for the encrypted content data recorded in the program area PA2 with the content key data KC1, KC2, . . .

Next, an encrypting process and a decrypting process for content data of the optical disc 1 according to the present invention will be described. Before describing the encrypting process and the decrypting process for the optical disc 1 according to the present invention, their basic encrypting process and decrypting process will be described.

Figure 4:
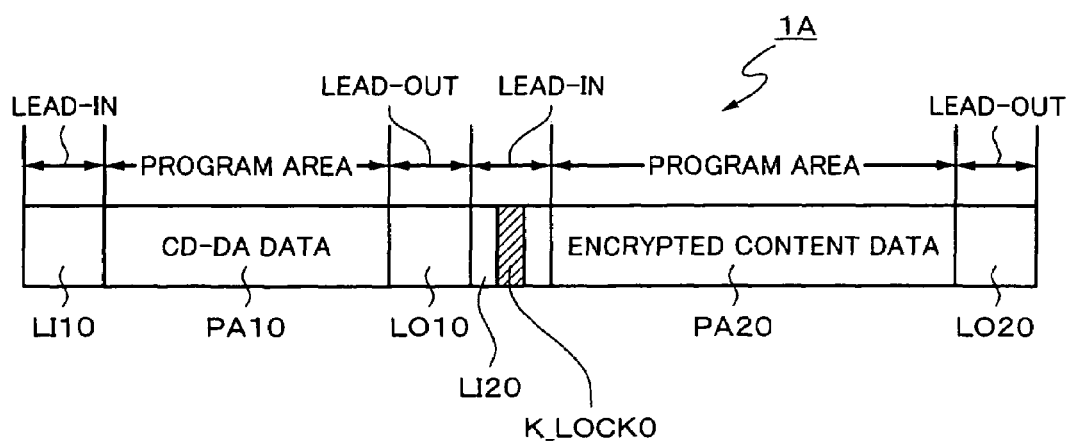
FIG. 4 is a schematic diagram for describing an example of the optical disc.

In an optical disc 1A for which the basic encrypting and decrypting processes will be described, as shown in. FIG. 4, on the innermost periphery of the optical disc 1A, a first lead-in area LI10 is formed. On the outer periphery of the lead-in area LI10, a first program area PA10 is formed. Outside the first program area PA10, a first lead-out area LO10 is formed. In the first program area PA10, audio content data has been recorded in the same recording format as the CD-DA standard. Outside the first lead-out area LO10, a second lead-in area LI20 is formed. On the outer periphery of the lead-out area LI20, a second program area PA20 is formed. Outside the second program area, a second lead-out area LO20 is formed. In the second program area PA20, content data that had been compressed corresponding to for example ATRAC3 and encrypted has been recorded. Content key data with which encrypted content data recorded in the second program area PA20 is decrypted is contained in a key locker K_LOCK0 and recorded in the second lead-in area LI20.

Figure 5:
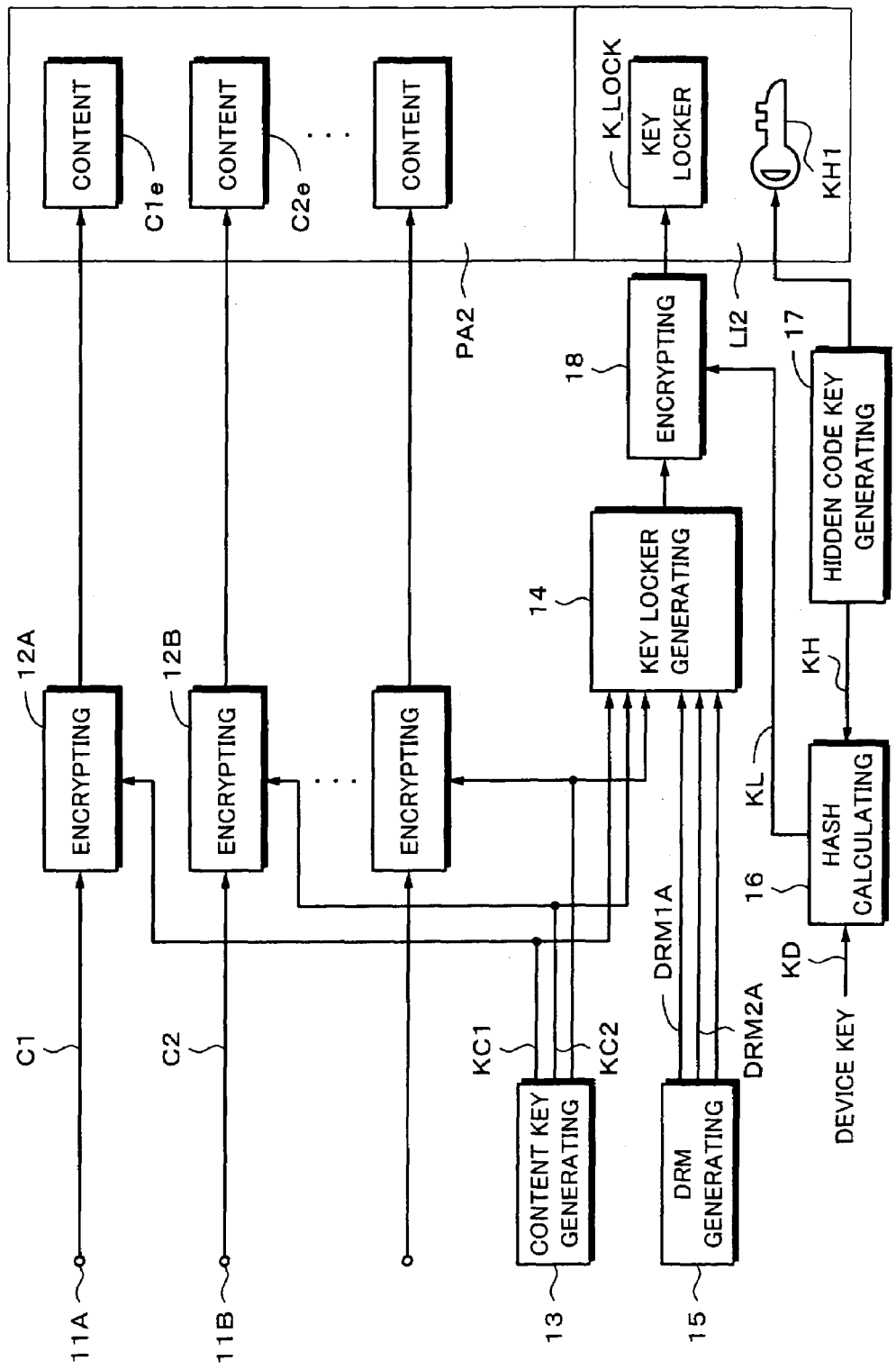
FIG. 5 is a block diagram for describing an encrypting process for the optical disc.

FIG. 5 shows a process for encrypting content data and recording it to the second program area PA20 of the conventional optical disc 1A.

In FIG. 5, content data C1, C2, . . . are supplied to content data input terminals 11A, 11B, . . . , respectively. The content data C1, C2, . . . are for example audio data of music programs compressed corresponding to for example ATRAC3. The content data C1, C2, . . . supplied from the content data input terminals 11A, 11B, . . . are supplied to encrypting circuits 12A 12B, . . . , respectively.

Content key data KC1, KC2, . . . with which the individual content data C1, C2, . . . are encrypted are generated by a content key generating circuit 13. The content key data KC1, KC2, . . . supplied from the content key generating circuit 13 are supplied to the encrypting circuits 12A 12B, . . . , respectively.

The content data C1, C2, . . . supplied from the content data input terminals 11A, 11B, . . . are encrypted with the content key data KC1, KC2, . . . by the encrypting circuits 12A 12B, . . . , respectively. Content data C1e, C2e, . . . that have been encrypted by the encrypting circuits 12A 12B, . . . are recorded in a program area PA2 of the optical disc.

The content key data KC1, KC2, . . . supplied from the content key generating circuit 13 are supplied to a key locker generating circuit 14.

The individual content data C1, C2, . . . supplied to the content data input terminals 11A, 11B, . . . contain copyright management information DRM1, DRM2, . . . , respectively. The copyright management information DRM1, DRM2, . . . are information that represents reproduction restrictions and copy restrictions with respect to the copyright management for individual pieces of content data. The copyright management information DRM1, DRM2, . . . are generated by a DRM generating circuit 15. With the copyright management information DRM1, DRM2, . . . , reproduction permission or prohibition, copy permission or prohibition, one generation copy permission or multi-generation copy permission, and so forth can be designated. The copyright management information DRM1, DRM2, . . . generated by the DRM generating circuit 15 are supplied to the key locker generating circuit 14.

The key locker generating circuit 14 encodes the content key data KC1, KC2, . . . sent from the content key generating circuit 13 and the copyright management information DRM1, DRM2, . . . supplied from the DRM generating circuit 15 and generates key locker data. Output data of the key locker generating circuit 14 is supplied to an encrypting circuit 18.

Key locker key data KL is supplied from a hash calculating circuit 16 to the encrypting circuit 18. The key locker key data KL is generated by hash calculating device key data KD and hidden code key data KH. The key locker data generated by the key locker generating circuit 14 is encrypted with the key locker key data KL supplied from the hash calculating circuit 16.

In other words, the device key data KD is supplied to the hash calculating circuit 16. In addition, the hidden code key data KH is supplied from a hidden code key generating circuit 17 to the hash calculating circuit 16. The device key data KD is stored somewhere in the player and recorder. The hidden code key data KH is generated as a random number by the hidden code key generating circuit 17. The hidden code key data KH is recorded in for example a lead-in area LI20 of the optical disc 1A.

The hash calculating circuit 16 generates the key locker key data KL with the device key data KD and the hidden code key data KH. The key locker key data KL is supplied to the encrypting circuit 18. The encrypting circuit 18 encrypts the key locker key data KL supplied from the key locker generating circuit 14 with the key locker key data KL supplied from the hash calculating circuit 16. Data that is recorded to key locker data K_LOCK0 encrypted by the encrypting circuit 18 is recorded in the lead-in area LI20 of the optical disc 1A.

Thus, in the encrypting process of the conventional optical disc 1A, the individual content data C1, C2, . . . are encrypted with the content key data KC1, KC2, . . . , respectively and recorded in the program area LI20. The content key data KC1, KC2, . . . with which the individual content data C1, C2, . . . are encrypted are stored along with the copyright management information DRM1, DRM2, . . . in the key locker data K_LOCK0 and encrypted and recorded in the lead-in area LI20 of the optical disc 1A.

Figure 6:
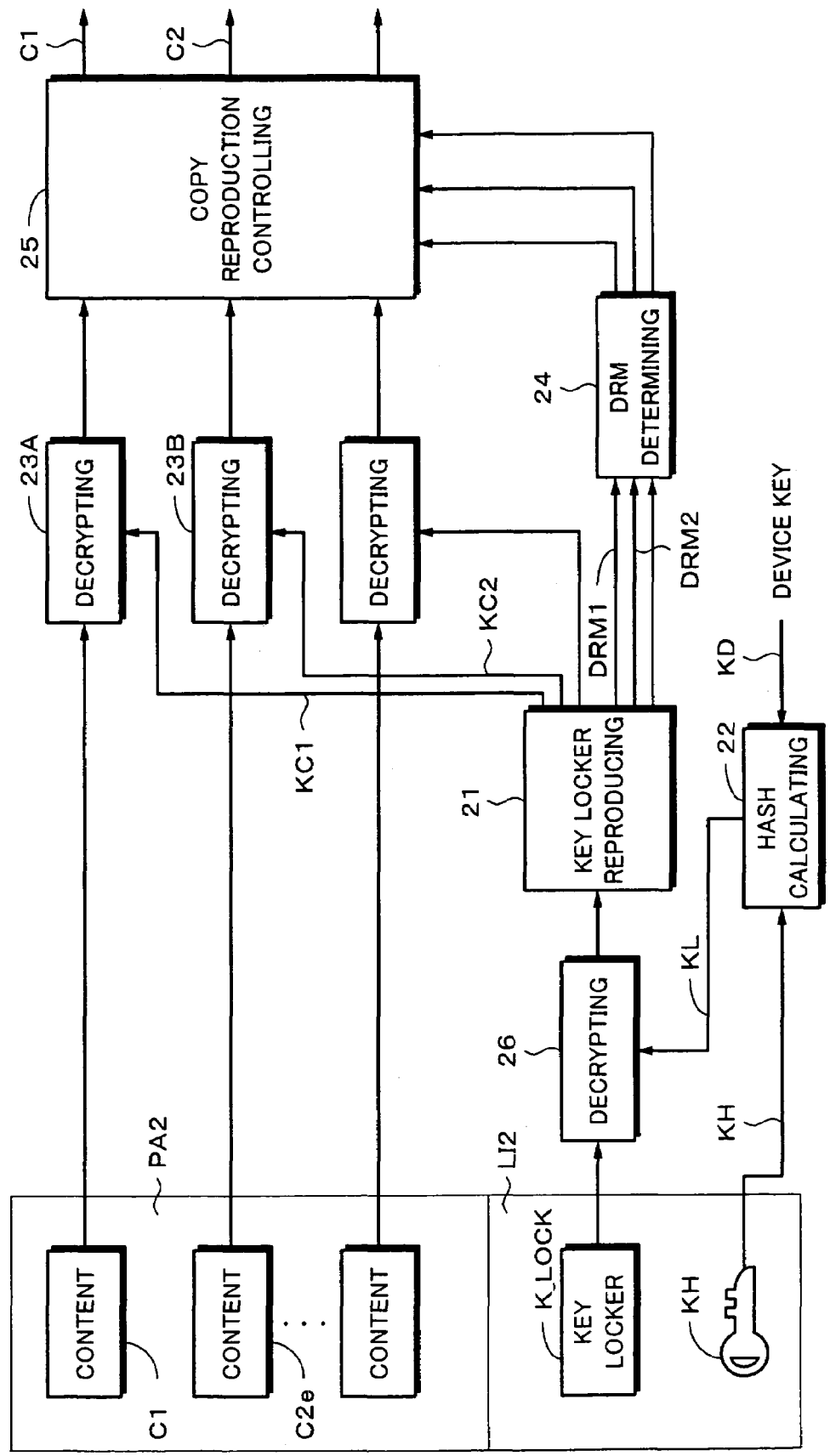
FIG. 6 is a block diagram for describing a decrypting process for the optical disc.

FIG. 6 shows a process for decrypting the encrypted content data C1e, C2e, . . . recorded on the optical disc 1A and obtaining the content data C1, C2, . . . , respectively.

The encrypted content data C1e, C2e, . . . are read from the program area PA20. The encrypted content data C1e, C2e, . . . are supplied to decrypting circuits 23A, 23B, . . . , respectively.

The encrypted key locker data K_LOCK0 and the hidden code key data KH are reproduced from the lead-in area LI20 of the optical disc 1A. The key locker data K_LOCK0 is sent to a decrypting circuit 26. On the other hand, the hidden code key data KH is sent to a hash calculating circuit 22.

Device key data KD that is stored somewhere in the reproducing apparatus or device is taken out. The device key data KD is sent to the hash calculating circuit 22. The hash calculating circuit 22 generates key locker key data KL with the hidden code key data KH and the device key data KD. The key locker key data KL is sent to the decrypting circuit 26.

The decrypting circuit 26 decrypts encrypted data recorded in the key locker K_LOCK0 with the key locker key data KL supplied from the hash calculating circuit 22. Data that is read from the decrypted key locker data K_LOCK0 is sent to a key locker reproducing circuit 21. The key locker reproducing circuit 21 takes out content key data KC1, KC2, . . . and copyright management information DRM1, DRM2, . . . from the data that is read from the key locker K_LOCK0.

The content key data KC1, KC2, . . . taken out by the key locker reproducing circuit 21 are supplied to decrypting circuits 23A, 23B, . . . , respectively. The copyright management information DRM1, DRM2, . . . taken out by the key locker reproducing circuit 21 are sent to a DRM determining circuit 24.

The DRM determining circuit 24 determines reproduction restrictions and copy restrictions for the individual content data C1, C2, . . . with the copyright management information DRM1, DRM2, . . . thereof. Information of the reproduction restrictions and copy restrictions for the individual content data C1, C2, . . . is supplied to a copy and reproduction controlling circuit 25.

The decrypting circuits 23A, 23B, . . . decrypt the encrypted content data C1e, C2e, . . . reproduced from the program area PA20 of the optical disc 1A and obtain content data C1, C2, . . . , respectively. The decrypted content data C1, C2, . . . are supplied to the copy and reproduction controlling circuit 25.

The copy and reproduction controlling circuit 25 performs reproduction restrictions and copy restrictions for the individual content data C1, C2, . . . corresponding to the information of the reproduction restrictions and copy restrictions supplied from the DRM determining circuit 24.

Thus, in the decrypting process for the optical disc 1A, the key locker data K_LOCK0 is read from the lead-in area LI20 of the optical disc 1A. The key locker reproducing circuit 21 takes out the content key data KC1, KC2, . . . and the copyright management information DRM1, DRM2, . . . from the key locker data K_LOCK0. The encrypted content data C1e, C2e, . . . that have been read from the program area PA20 of the optical disc are sent to the decrypting circuits 23A, 23B, . . . , respectively. The content data C1, C2, . . . are decrypted with the content key data KC1, KC2, . . . extracted from the key locker data K_LOCK0 in the lead-in area LI20. The key locker reproducing circuit 21 extracts the copyright management information DRM1, DRM2, . . . . With the copyright management information DRM1, DRM2, . . . , reproductions and copies of the individual content data C1, C2, . . . are controlled.

In such a manner, the individual content data C1, C2, . . . of the optical disc 1A are individually encrypted. The individual content data C1, C2, . . . contain the copyright management information DRM1, DRM2, . . . , respectively. Reproduction conditions and copy conditions can be individually designated for the individual content data C1, C2, . . . Thus, with the same content data recorded in the program area PA20, when the number of pieces of content key data KC1, KC2, . . . stored in the key locker data K_LOCK0 is changed or the reproduction restrictions and copy restrictions of the copyright management information DRM1, DRM2, . . . stored in the key locker data K_LOCK are changed, reproducible content data, reproduction conditions, and copy conditions can be changed.

Figure 7:
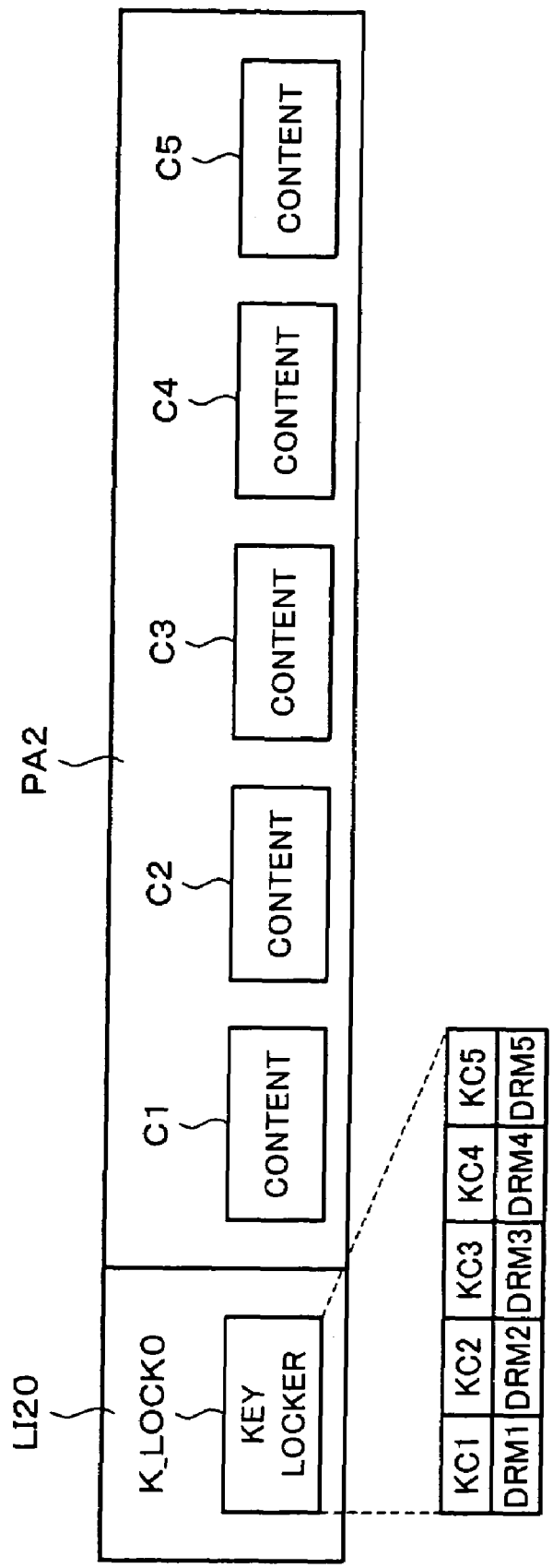
FIG. 7 is a schematic diagram for describing a key locker of the optical disc.
Figure 8:
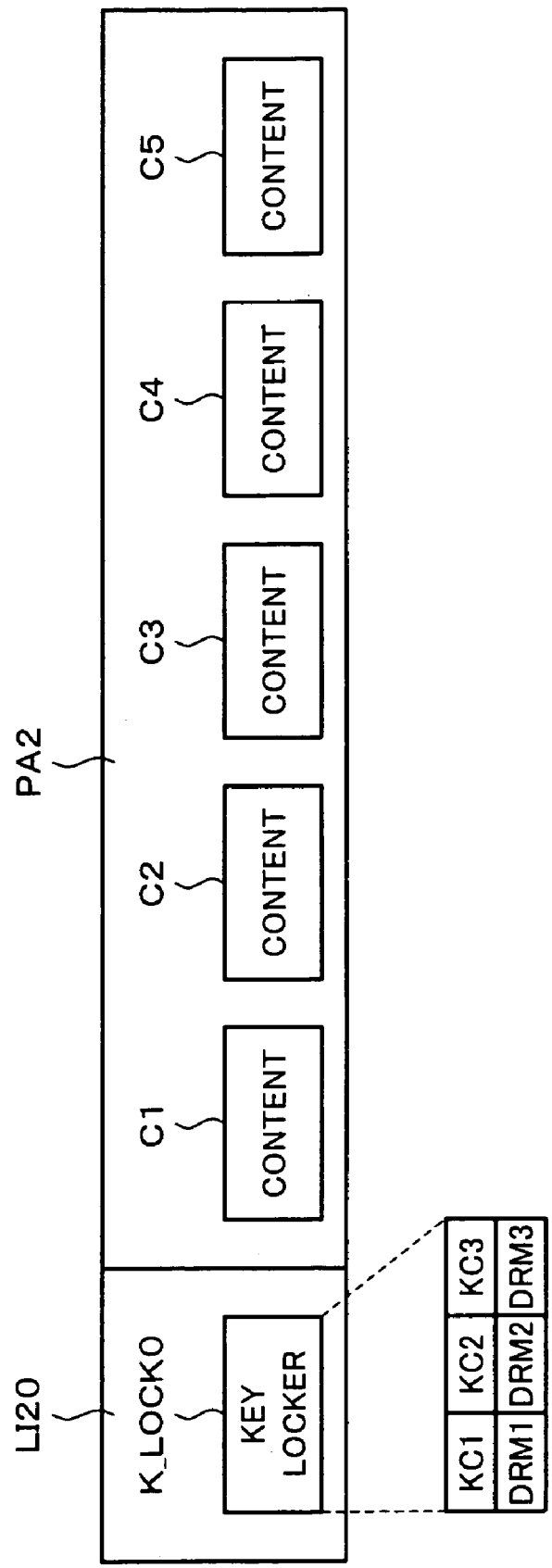
FIG. 8 is a schematic diagram for describing a key locker of the optical disc.

In other words, in examples shown in FIG. 7 and FIG. 8, the same content data C1, C2, C3, C4, and C5 have been recorded in a program area PA2 of an optical disc. In the example shown in FIG. 7, all content key data KC1, KC2, KC3, KC4, and KC5 and copyright management information DRM1, DRM2, DRM3, DRM4, and DRM5 for the content data C1, C2, C3, C4, and C5 have been recorded. In that case, when the copyright management information DRM1, DRM2, DRM3, DRM4, and DRM5 represent reproduction permissions, all the content data C1, C2, C3, C4, and C5 can be decrypted.

In the example shown in FIG. 8, although the content data C1, C2, C3, C4, and C5 have been recorded on the optical disc 1A like in the example shown in FIG. 7, only the content key data KC1, KC2, and KC3 and the copyright management information DRM1, DRM2, and DRM3 for the content data C1, C2, and C3 have been recorded in the key locker data K_LOCK0. In that case, although the content data C1, C2, C3, C4, and C5 have been recorded on the optical disc 1A, only the content data C1, C2, and C3 can be reproduced.

Thus, even if the same content data is recorded on the optical disc 1A, when the number of pieces of content key data stored in the key locker data K_LOCK0 is restricted, the number of pieces of reproducible content data can be restricted.

In examples shown in FIG. 9 and FIG. 10, the same content data C1, C2, C3, C4, and C5 have been recorded in the program area PA20 of the optical disc 1A. In the example shown in FIG. 9, the content key data KC1, KC2, KC3, KC4, and KC5 and the copyright management information DRM1, DRM2, DRM3, DRM4, and DRM5 that represent copy permissions have been recoded in the key locker data K_LOCK0. In that case, since all the copyright management information DRM1, DRM2, DRM3, DRM4, and DRM5 represent copy permissions, all the content data C1, C2, C3, C4, and C5 can be copied.

In the example shown in FIG. 10, although the content data C1, C2, C3, C4, and C5 have been recorded on the optical disc 1A as in the example shown in FIG. 9, the content key data KC1, KC2, KC3, KC4, and KC5 and the copyright management information DRM1, DRM2, DRM3, DRM4, and DRM5 that represent copy prohibitions have been recorded in the key locker data K_LOCK0. In that case, since all the copyright management information DRM1, DRM2, DRM3, DRM4, and DRM5 represent copy prohibitions, the content data C1, C2, C3, C4, and C5 cannot be copied.

Thus, even if the same content data C1, C2, C3, C4, and C5 are recorded on the optical disc 1A, when the copyright management information DRM1, DRM2, DRM3, DRM4, and DRM5 stored in the key locker data K_LOCK0 are changed, the number of pieces of reproducible content data, copy conditions, and reproduction conditions are changed.

According to the embodiment of the present invention, using that structure, even if data is reproduced from the same disc, the number of pieces of reproducible content data, the copy conditions, and reproduction conditions can be changed depending on whether the drive that can deal with the optical disc 1 or the conventional drive that cannot deal with the optical disc 1 is used.

Next, the encrypting process and the decrypting process for the optical disc 1 according to the present invention will be described.

Figure 11A:
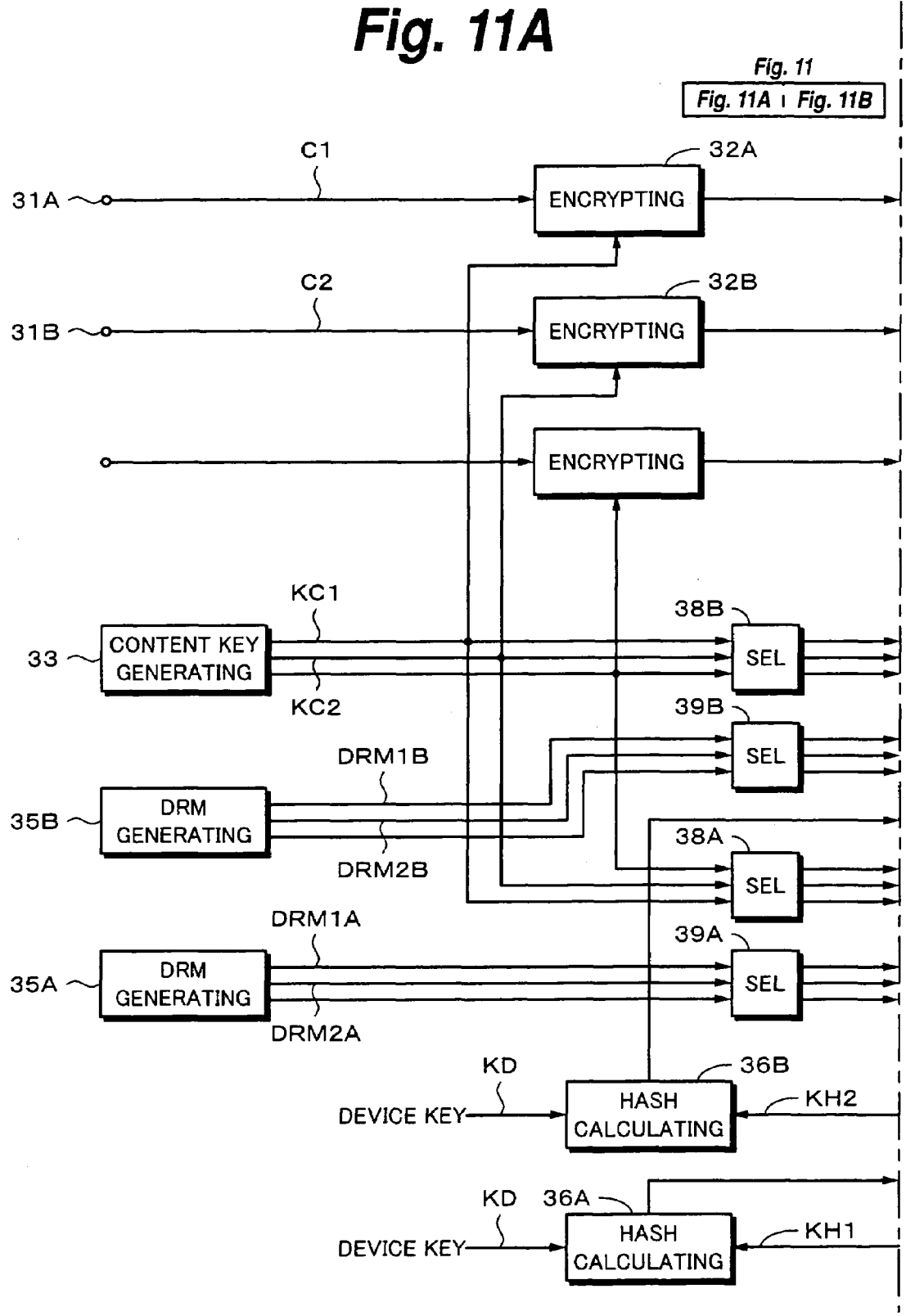
FIG. 11A and FIG. 11B are a block diagram for describing an encrypting process for the optical disc according to the present invention.
Figure 11B:
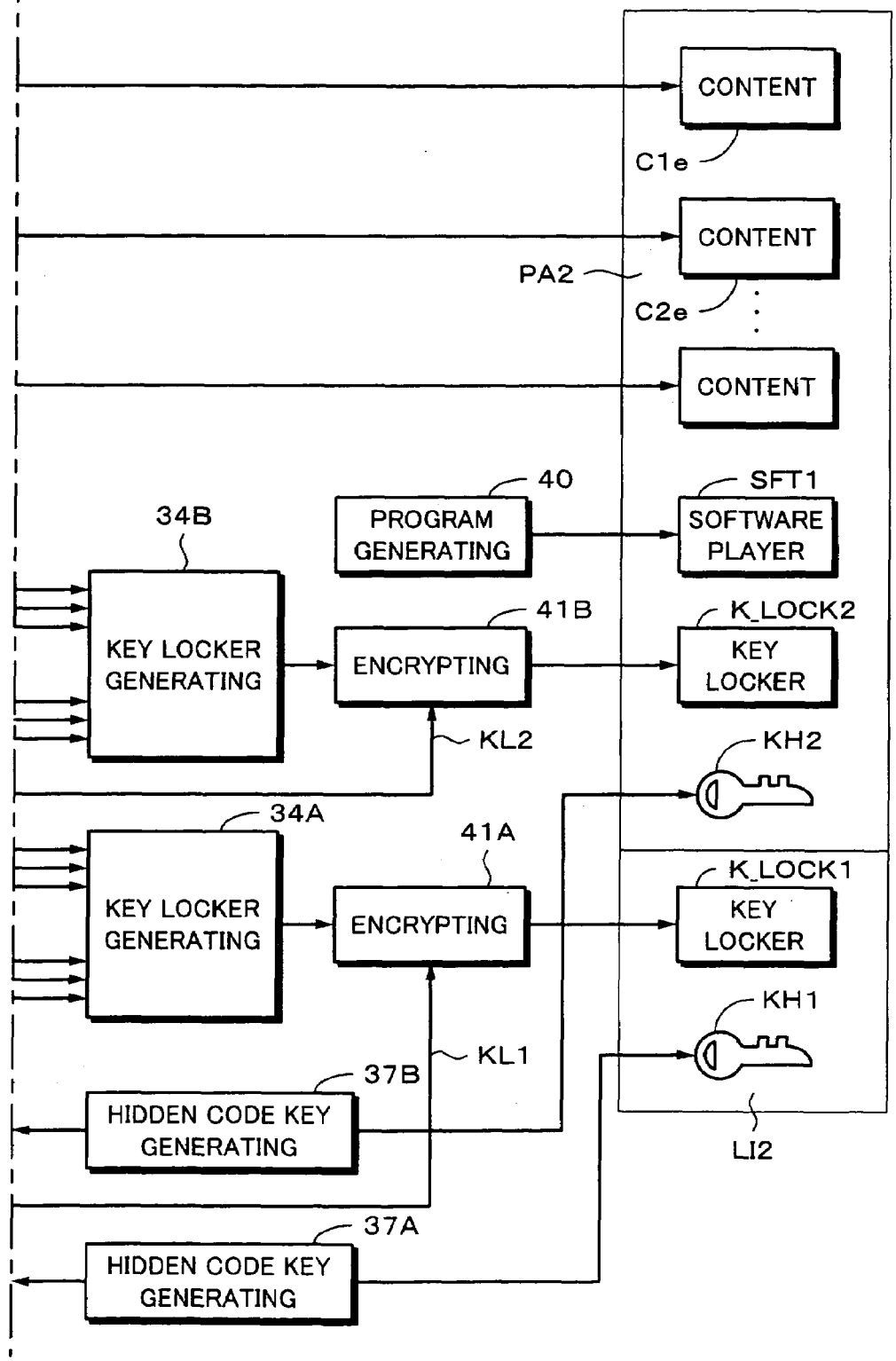

FIG. 11A and FIG. 11B show the encrypting process for the optical disc 1 according to the present invention. In FIG. 11A and FIG. 11B, content data C1, C2, . . . are supplied to content data input terminals 31A, 31B, 31C, . . . , respectively. The content data C1, C2, . . . are content data that has been compressed corresponding to for example ATRAC3. The content data C1, C2, . . . supplied from the content data input terminals 31A, 31B, 31C, . . . are supplied to encrypting circuits 32A, 32B, . . . , respectively.

Content key data KC1, KC2, . . . with which the individual content data C1, C2, . . . are encrypted are generated by a content key generating circuit 33. The content key data KC1, KC2, . . . are supplied to the encrypting circuits 32A, 32B, . . . , respectively.

The encrypting circuits 32A, 32B, . . . encrypt the content data C1, C2, . . . supplied from the content data input terminals 31A, 31B, . . . with the content key data KC1, KC2, . . . supplied from the content key generating circuit 33, respectively. Content data C1e, C2e, . . . encrypted by the encrypting circuits 32A, 32B, . . . are recorded in a program area PA2 of the optical disc 1.

The content key data KC1, KC2, . . . supplied from the content key generating circuit 33 are supplied to selectors 38A and 38B. The selectors 38A and 38B select desired content key data from the content key data KC1, KC2, . . . generated by the content key generating circuit 33. Content key data selected by the selectors 38A and 38B is supplied to key locker generating circuits 34A and 34B, respectively.

The individual content data C1, C2, . . . supplied to the content data input terminals 31A, 31B, . . . contains copyright management information DRM1, DRM2, . . . , respectively. The copyright management information DRM1, DRM2, . . . are information of reproduction restrictions and copy restrictions with respect to the copyright management for content data. With the copyright management information DRM1, DRM2, . . . , reproduction permission or prohibition, copy permission or prohibition, one generation copy permission or multi-generation copy permission, and so forth can be designated.

A DRM generating circuit 35A generates copyright management information DRM1A, DRM2A, DRM3A, . . . to be recorded in the read-in area LI2. The copyright management information DRM1A, DRM2A, DRM3A, . . . generated by the DRM generating circuit 35A are supplied to a selector 39A.

A DRM generating circuit 35B generates copyright management information DRM1B, DRM2B, . . . to be recorded in the program area PA2. The copyright management information DRM1B, DRM2B, . . . generated by the DRM generating circuit 35B are supplied to a selector 39B.

The selectors 39A and 39B select desired copyright management information from the copyright management information DRM1A, DRM2A, . . . generated by the DRM generating circuit 35A and from the copyright management information DRM1B, DRM2B, . . . generated by the DRM generating circuit 35B. The copyright management information selected by the selectors 39A and 39B is supplied to the key locker generating circuits 34A and 34B.

The key locker generating circuit 34A encodes the content key data KC1, KC2, . . . sent from the content key generating circuit 33 and the copyright management information DRM1A, DRM2A, . . . sent from the DRM generating circuit 35A and generates data to be recorded in the key locker portion. Output data of the key locker generating circuit 34A is supplied to an encrypting circuit 41A.

Key locker key data KL1 is supplied from a hash calculating circuit 36A to the encrypting circuit 41A. The key locker key data KL1 is generated by hash calculating device key data KD and hidden code key data KH1. With the key locker key data KL1, data supplied from the key locker generating circuit 34A and to be recorded in the key locker portion is encrypted.

In other words, the device key data KD is supplied to the hash calculating circuit 36A. In addition, the hidden code key data KH1 supplied from a hidden code key generating circuit 37A is supplied to the hash calculating circuit 36A. The device key data KD is stored somewhere in the player and recorder. The hidden code key data KH1 is generated as a random number by the hidden code key generating circuit 37A. The hidden code key data KH1 is recorded in for example the lead-in area LI2 of the optical disc 1.

With the device key data KD and the hidden code key data KH1 generated by the hidden code key generating circuit 37A, the hash calculating circuit 36A generates the key locker key data KL1. The key locker key data KL1 is supplied to the encrypting circuit 41A. The encrypting circuit 41A encrypts key locker information supplied from the key locker generating circuit 34A with the key locker key data KL1 supplied from the hash calculating circuit 36A.

Key locker data K_LOCK1 that has been generated by the key locker generating circuit 34A and encrypted by the encrypting circuit 41A is recorded in the lead-in area LI2 of the optical disc 1.

The key locker generating circuit 34B encodes the content key data KC1, KC2, . . . sent from the content key generating circuit 33 and the copyright management information DRM1B, DRM2B, . . . sent from the DRM generating circuit 35B and generates key locker data. The key locker data generated by the key locker generating circuit 34B is supplied to an encrypting circuit 41B.

Key locker key data KL2 supplied from a hash calculating circuit 36B is supplied to the encrypting circuit 41B. The encrypting circuit 41B encrypts the key locker data supplied from the key locker generating circuit 34B with the key locker key data KL2 supplied from the hash calculating circuit 36B. The key locker key data KL2 is generated by hash calculating the device key data KD and hidden code key data KH2.

In other words, the device key data KD is supplied to the hash calculating circuit 36B. In addition, the hidden code key data KH2 supplied from the hidden code key generating circuit 37B is supplied to the hash calculating circuit 36B. The hidden code key data KH2 is generated as a random number by the hidden code key generating circuit 37B. The hidden code key data KH2 is recorded in for example the program area PA2 of the optical disc 1.

The hash calculating circuit 36B generates the key locker key data KL2 with the device key data KD and the hidden code key data KH2 generated by the hidden code key generating circuit 37B. The key locker key data KL2 is supplied to the encrypting circuit 41B. The encrypting circuit 41B encrypts the key locker data supplied from the key locker generating circuit 34B with the key locker key data KL2 supplied from the hash calculating circuit 36B.

Key locker data K_LOCK2 that has been generated by the key locker generating circuit 34B and encrypted by the encrypting circuit 41B is recorded in the program area PA2 of the optical disc 1.

A program generating circuit 40 generates application data for a software player SFT1 with which content data is decrypted. The application data of the software player SFT1 is recorded in the program area PA2 of the optical disc.

As described above, in the encrypting process of the optical disc 1 according to the present invention, the individual content data C1, C2, . . . are encrypted with the content key data KC1, KC2, . . . , respectively and recorded in the program area PA2 of the optical disc 1. The content key data KC1, KC2, . . . with which the individual content data C1, C2, . . . are encrypted are stored along with the copyright management information DRM1A, DRM2A, . . . in the key locker data K_LOCK1 and recorded in the lead-in area LI2 of the optical disc 1. In addition, the content key data KC1, KC2, . . . with which the individual content data C1, C2, . . . are encrypted are stored along with the copyright management information DRM1B, DRM2B, . . . in the key locker data K_LOCK2 and recorded in the program area PA2 of the optical disc 1.

FIG. 12 and FIG. 13 show a decrypting process for content data of the optical disc 1 according to the present invention. In the optical disc according to the present invention, the decrypting process performed when the drive and player that can deal with the optical disc 1 reproduces content data therefrom is different from the decrypting process performed when the drive and player that cannot deal with the optical disc 1 reproduces content data therefrom. FIG. 12 shows a decrypting process performed when the drive or player that can deal with the optical disc 1 reproduces content data therefrom. FIG. 13 shows a decrypting process performed when the drive or player that cannot deal with the optical disc 1 reproduces content data therefrom.

In FIG. 12, encrypted content data C1e, C2e, . . . are reproduced from a program area PA2 of the optical disc 1. The encrypted content data C1e, C2e, . . . are supplied to decrypting circuits 43A, 43B, 43C, . . . , respectively.

Key locker data K_LOCK1 and hidden code key data KH1 are read from a lead-in area LI2 of the optical disc 1. The key locker data K_LOCK1 is supplied to a decrypting circuit 47.

The hidden code key data KH1 is read from the lead-in area LI2 of the optical disc 1. The hidden code key data KH1 is supplied to a hash calculating circuit 42. Device key data KD is taken out from the apparatus or device that reproduces the optical disc 1. The device key data KD is sent to the hash calculating circuit 42. The hash calculating circuit 42 generates key locker key data KL1 with the hidden code key data KH1 and the device key data KD. The key locker key data KL1 is sent to a key locker reproducing circuit 48.

The decrypting circuit 47 decrypts key locker data K_LOCK1 with the key locker key data KL1 supplied from the hash calculating circuit 42. An output of the decrypting circuit 47 is supplied to the key locker reproducing circuit 48.

The key locker reproducing circuit 48 takes out the content key data KC1, KC2, . . . and copyright management information DRM1A, DRM2A, . . . from the key locker data K_LOCK1.

The content key data KC1, KC2, . . . taken out by the key locker reproducing circuit 48 are supplied to decrypting circuits 43A, 43B, . . . , respectively. The copyright management information DRM1A, DRM2A, . . . taken out by the key locker reproducing circuit 48 are supplied to a DRM determining circuit 44.

The DRM determining circuit 44 determines reproduction restrictions and copy restrictions of the individual content data C1, C2, . . . with the copyright management information DRM1A, DRM2A, . . . thereof, respectively. Information of the reproduction restrictions and copy restrictions of the individual content data C1, C2, . . . are supplied to a copy and reproduction controlling circuit 45.

The decrypting circuits 43A, 43B, . . . decrypt the encrypted content data C1e, C2e, C3e. . . reproduced from the program area PA2 of the optical disc 1 with the content key data KC1, KC2, . . . sent from the key locker reproducing circuit 48 and obtains the content data C1, C2, . . . , respectively. The decrypted content data C1, C2, . . . are sent to the copy and reproduction controlling circuit 45. The copy and reproduction controlling circuit 45 performs reproduction restrictions and copy restrictions for the individual content data C1, C2, . . . with the information of the reproduction restrictions and copy restrictions supplied from the DRM determining circuit 44.

As described above, in the decrypting process of the drive and player that can deal with the optical disc 1, the key locker data K_LOCK1 is read from the lead-in area LI2 of the optical disc 1. The key locker reproducing circuit 48 takes out the content key data KC1, KC2, . . . and the copyright management information DRM1A, DRM2A, . . . from the key locker data K_LOCK1. The encrypted content data C1e, C2e, . . . reproduced from the program area PA2 of the optical disc 1 are sent to the decrypting circuits 43A, 43B, . . . , respectively. The encrypted content data C1e, C2e, . . . are decrypted with the content key data KC1, KC2, . . . taken out from the key locker data K_LOCK1 of the lead-in area LI2. As a result, the content data C1, C2, . . . are obtained. The key locker reproducing circuit 48 obtains the copyright management information DRM1A, DRM2A, . . . and controls the reproductions and copies of the individual content data C1, C2, . . . with the copyright management information DRM1A, DRM2A, . . . , respectively.

FIG. 13 shows a decrypting process of the conventional player and driver that cannot deal with the optical disc 1.

In FIG. 13, an application of a software player SFT1 is read from a program area PA2 of the optical disc 1. Application data of the software player SFT1 is sent to a software program executing circuit 60. With the application data of the software player SFT1, a decrypting process can be executed by software. The application of the software player SFT1 may not be the main body of the application that executes the decrypting process, but a part thereof.

Key locker data K_LOCK2 and hidden code key data KH2 are read from the program area PA2. The key locker key data K_LOCK2 is supplied to a decrypting circuit 57.

The hidden code key data KH2 is sent to a hash calculating circuit 52. Device key data KD is taken out from the device. The device key data KD is sent to the hash calculating circuit 52. The hash calculating circuit 52 generates key locker key data KL2 with the hidden code key data KH2 and the device key data KD. The key locker key data KL2 is sent to the decrypting circuit 57.

The decrypting circuit 57 decrypts data of the key locker data K_LOCK2 with the key locker key data KL2 supplied from the hash calculating circuit 52. The key locker data K_LOCK2 decrypted by the decrypting circuit 57 is supplied to a key locker reproducing circuit 51.

The key locker reproducing circuit 51 takes out content key data KC1, KC2, ... and copyright management information DRM1B, DRM2B, ... from the key locker data K_LOCK2. The content key data KC1, KC2, ... taken out by the key locker reproducing circuit 51 are supplied to decrypting circuits 53A, 53B, 53C, ..., respectively. The copyright management information DRM1B, DRM2B, ... taken out by the key locker reproducing circuit 51 are sent to a DRM determining circuit 54.

The DRM determining circuit 54 determines reproduction restrictions and copy restrictions of the individual content data C1, C2, ... with the copyright management information DRM1B, DRM2B, ..., respectively. The information of the reproduction restrictions and copy restrictions of the individual content data C1, C2, ... is sent to a copy and reproduction controlling circuit 55.

The decrypting circuits 53A, 53B, 53C, ... decrypt the encrypted content data C1e, C2e, C3e, ... reproduced from the program area PA2 of the optical disc 1 and obtains the decrypted content data C1, C2, ..., respectively. The decrypted content data C1, C2, ... are sent to the copy and reproduction controlling circuit 55. The copy and reproduction controlling circuit 55 performs the reproduction restrictions and copy restrictions of the content data C1, C2, ... with the information of the reproduction restrictions and copy restrictions supplied from the DRM determining circuit 54.

In the decrypting process of the drive and player that cannot deal with the optical disc 1, the key locker data K_LOCK2 is read from the program area PA2 of the optical disc 1. The key locker reproducing circuit 51 takes out the content key data KC1, KC2, ... and the copyright management information DRM1B, DRM2B, . . . from the key locker data K_LOCK2. The encrypted content data C1e, C2e, ... reproduced from the program area PA2 of the optical disc 1 are sent to the decrypting circuits 43A, 43B, ..., respectively. The encrypted content data C1e, C2e, ... are decrypted with the content key data KC1, KC2, ... taken out from the key locker data K_LOCK2 of the program area PA2, respectively. As a result, the decrypted content data C1, C2, ... are obtained. The copyright management information DRM1B, DRM2B, ... are taken out by the key locker reproducing circuit 51. With the copyright management information DRM1B, DRM2B, ..., the reproductions and copies of the individual content data C1, C2, ... are controlled.

As shown in FIG. 11A and FIG. 11B, in the encrypting process for the optical disc 1 according to the present invention, the selectors 38A and 38B are provided. The selectors 38A and 38B select desired content key data KC1, KC2, ... from the content key data KC1, KC2, ... supplied to the key locker generating circuits 34A and 34B and contain the selected content key data in the key locker data K_LOCK1 and K_LOCK2. The DRM generating circuit 35A, which generates the copyright management information DRM1A, DRM2A, ... contained in the key locker data K_LOCK1 recorded in the lead-in area LI2, and the DRM generating circuit 35B, which generates the copyright management information DRM1B, DRM2B, ... contained in the key locker data K_LOCK2 recorded in the program area PA2, are separately disposed. The selectors 39A and 39B select desired copyright management information from the copyright management information DRM1A, DRM2A, ... and DRM1B, DRM2B, ... supplied to the key locker generating circuits 34A and 34B, respectively.

Thus, the content key data KC1, KC2, ... and the copyright management information DRM1A, DRM2A, ... contained in the key locker data K_LOCK1 recorded in the lead-in area LI2 and the content key data KC1, KC2, ... and the copyright management information DRM1B, DRM2B, ... contained in the key locker data K_LOCK2 recorded in the program area PA2 can be separately designated.

In such a structure, when contents of the key locker data K_LOCK1 recorded in the lead-in area LI2 and the contents of the key locker data K_LOCK2 recorded in the program area PA2 are separately designated, content data reproduced by the player and drive that can deal with the optical disc 1 and content data reproduced by the drive and player that cannot deal with the optical disc 1 can be distinguished in the number of pieces of reproducible content data, titles, reproduction conditions, and copy conditions.

In other words, it is supposed that the key locker data K_LOCK1 recorded in the lead-in area LI2 can be read by only the player and drive that can deal with the optical disc 1. Thus, since the secrecy is high, the possibility of which content data is illegally reproduced and copied is low. In contrast, the key locker data K_LOCK2 recorded in the program area PA2 is read by the conventional player and drive. Thus, since the secrecy is low, the possibility of which content data is illegally reproduced and copied is high.

Thus, it is considered that with the key locker data K_LOCK1, which is recorded in the high secrecy lead-in area LI2, the number of reproducible contents can be increased, the qualities of reproducible contents are higher or management restrictions with respect to copyright management are more advantageous such as more added values with additional information than with the key locker data K_LOCK2 recorded in the low secrecy program area PA2. As a result, with additional information, added values can be increased.

For example, as shown in FIG. 14, it is assumed that content data C1, C2, C3, C4, C5, ... have been recorded in a program area PA2 of the optical disc 1. In key locker data K_LOCK1 in a high secrecy lead-in area LI2, content key data KC1, KC2, KC3, KC4, and KC5 of the content data C1, C2, C3, C4, C5, ... are recorded. In addition, copyright management information DRM1A, DRM2A, DRM3A, DRM4A, DRM5A, ... are recorded.

In contrast, in key locker data K_LOCK2 in a low secrecy program area PA2, content key data KC1, KC2, KC3, ... and copyright management information DRM1B, DRM2B, DRM3B, ... of the content data C1, C2, C3, ... are recorded.

In that case, when the key locker data K_LOCK1 in the lead-in area LI2 is used, all the content data C1, C2, C3, C4, C5, . . . can be decrypted and reproduced. In contrast, when the key locker data K_LOCK2 in the program area PA2 is used, since there are not the content key data KC4 and KC5 with which the content data C4 and C5 are decrypted, only three content data C1, C2, C3, . . . can be reproduced.

Thus, although the new type player and drive that can deal with the optical disc 1 can reproduce the content data C1, C2, C3, C4, C5, . . . , the drive and player that cannot deal with the optical disc 1 can reproduce only the content data C1, C2, C3, . . . .

In that example, with the key locker data K_LOCK1 in the high secrecy lead-in area LI, the number of pieces of reproducible content data thus added values are larger than that with the key locker data K_LOCK2 in the low secrecy program area PA2.

Figure 15:
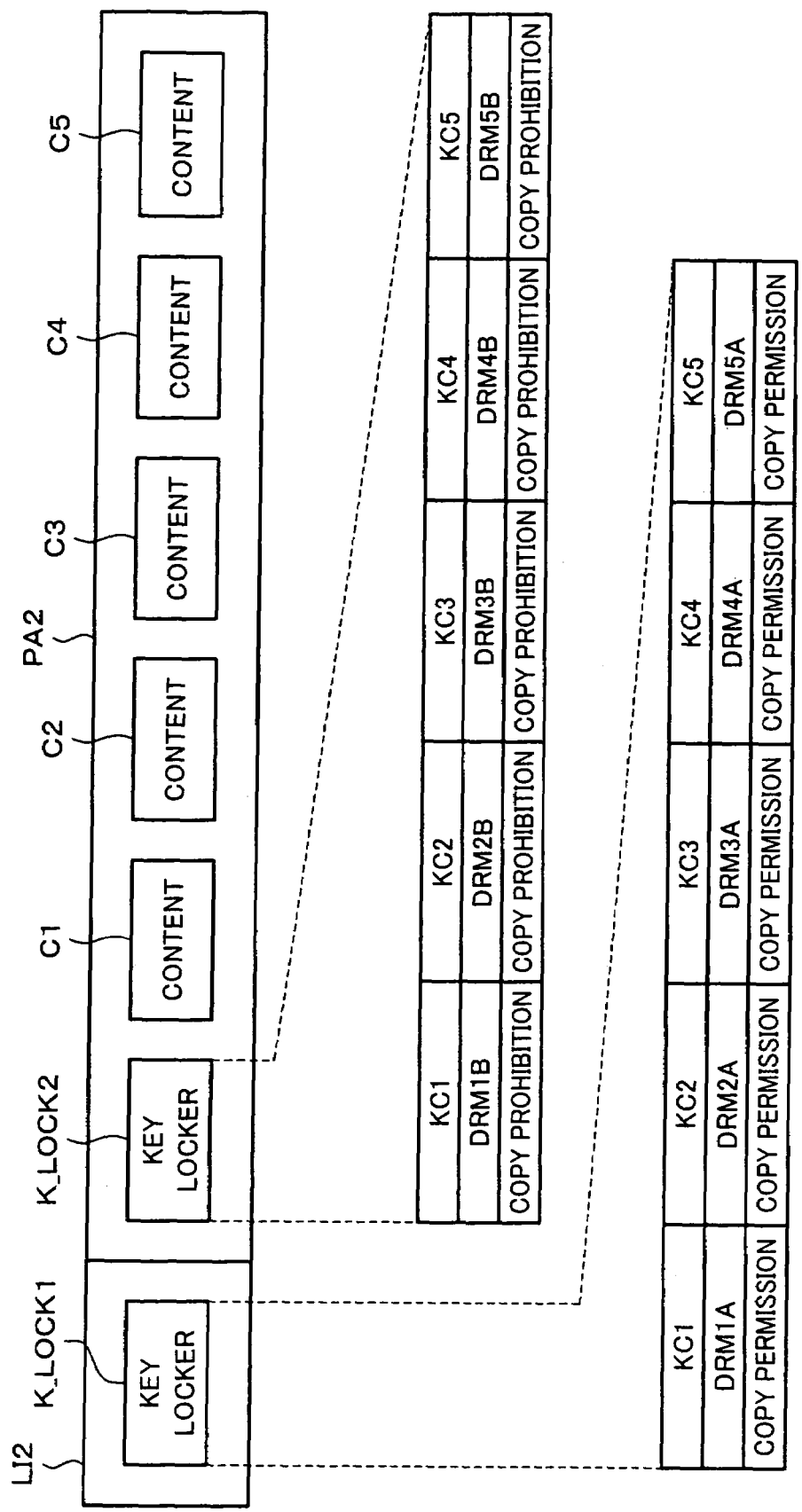
FIG. 15 is a block diagram for describing a key locker of the optical disc according to an example of the present invention.

For example, as shown in FIG. 15, in key locker data K_LOCK1 in a high secrecy lead-in area LI2, content key data KC1, KC2, KC3, KC4, and KC5 and copyright management information DRM1, DRM2, DRM3, DRM4, DRM5, . . . of content data C1, C2, C3, C4, C5, . . . have been recorded. All the copyright management information DRM1A, DRM2A, DRM3A, DRM4A, DRM5A, . . . represent copy permissions.

In contrast, in key locker data K_LOCK2 in a low secrecy program area PA2, content key data KC1, KC2, . . . KC3, KC4, and KC5 and copyright management information DRM1B, DRM2B, DRM3B, DRM4B, DRM5B, . . . of content data C1, C2, C3, C4, C5, . . . have been recorded. All the copyright management information DRM1B, DRM2B, DRM3B, DRM4B, DRM5B, . . . represent copy prohibitions.

In that case, when the key locker data K_LOCK1 in the lead-in area LI2 is used, all the recorded content data C1, C2, C3, C4, C5, . . . can be copied. However, when the key locker data K_LOCK2 in the program area PA2 is used, all the content data C1, C2, C3, C4, C5, . . . cannot be copied.

Thus, although the new type player and drive, which can deal with the optical disc 1, can copy the content data C1, C2, C3, C4, C5, . . . , the conventional drive and player, which cannot deal with the optical disc 1 can reproduce the content data C1, C2, C3, C4, C5, . . . , but they cannot not copy them.

In that example, with the key locker data in the high secrecy lead-in area, the management restrictions with respect to the copyright management are more advantageous and added values becomes higher than those with the key locker data in the low secrecy program area.

Thus, when the key locker data K_LOCK1 and K_LOCK2 are recorded in the lead-in area LI2 and the program area PA2, respectively, with the key locker data K_LOCK1 in the high secrecy lead-in area LI2, the number of pieces of reproducible content data is larger, the copyright management is more advantageous, and added values are larger than with the key locker data K_LOCK2 in the program area PA2.

It is supposed that the key locker data K_LOCK1 and K_LOCK2 recorded in the high secrecy lead-in area LI2 and low secrecy program area PA2 have the following structures.

In the key locker data K_LOCK1 recorded in the lead-in area and/or the lead-out area, which is a high secrecy recording position, the number of pieces of copyright management information is lower than in the key locker data K_LOCK2 in the program area, which is a low secrecy recording position. As a result, with the copyright management information recorded in the lead-in area and/or the lead-out area, the number of reproducible music programs is larger than with the copyright management information recorded in the program area.

In the key locker data K_LOCK1 recorded in the lead-in area and/or the lead-out area, which is a high secrecy recording position, the management restrictions of copyright management information are looser than in the key locker data K_LOCK2 recorded in the program area, which is a low secrecy recording position. For example, when the copyright management information of the key locker recorded in the lead-in area and/or the lead-out area represents copy permissions, the copyright management information of the program area may represent copy prohibitions. Likewise, when the copyright management information of the key locker data recorded in the lead-in area and/or the lead-out area represents multi-generation copy permissions, the copyright management information of the program area may represent one-generation copy permissions.

Copyright management information of the key locker data K_LOCK1 recorded in the lead-in area and/or the lead-out area, which is a high secrecy recording position, may represent higher quality content data and more added values with additional information than copyright management information of the key locker data K_LOCK2 in the program area, which is a low secrecy position. For example, while copyright management information of the key locker data K_LOCK1 in the lead-in area and/or the lead-out area represents reproduction permission of all music programs, copyright management information of the key locker data K_LOCK2 in the program area may represent reproduction permissions of only feature portions or narrations of music programs. In such a manner, content qualities are distinguished. Alternatively, copyright management information of the key locker data K_LOCK1 recorded in the lead-in area and/or the lead-out area may contain music programs and promotion still pictures and moving pictures thereof. In contrast, copyright management information of the key locker data K_LOCK2 in the program area may contain only music programs, omitting their promotion still pictures and moving pictures. In such a manner, the copyright management information of the key locker data K_LOCK1 and the copyright management information of the key locker data K_LOCK2 are distinguished.

The number of pieces of content key data of the key locker data K_LOCK1 recorded in the lead-in area and/or the lead-out area, which is a high secrecy recording position, is smaller than that of the key locker data K_LOCK2 of the program area, which is a low secrecy recording position. Thus, the number of music programs reproduced with the content key data of the key locker recorded in the key locker data K_LOCK1 recorded in the lead-in area and/or the lead-out area is larger than that with the content key data of the key locker data K_LOCK2 recorded in the program area.

With the content key data of the key locker data K_LOCK1 recorded in the lead-in area and/or the lead-out area, which is a high secrecy recording position, higher quality contents can be reproduced and more added values can be obtained with additional information than the content key data of the key locker data K_LOCK2 in the program area, which is a low secrecy recording position. For example, with the content key data of the key locker data K_LOCK1 recorded in the lead-in area and/or the lead-out area, which is a high secrecy recording position, all music programs can be reproduced. In contrast, with the content key data of the key locker data K_LOCK2 recorded in the program area, only feature portions and narrations of music programs can be reproduced. In such a manner, qualities of content data to be reproduced are distinguished. Alternatively, the content key data of the key locker data K_LOCK1 recorded in the lead-in area and/or the lead-out area is key data for music programs and promotion still pictures and moving pictures thereof. In contrast, the content key data of the key locker data K_LOCK2 recording in the program area contain is key data for only music programs, omitting promotion still pictures and moving pictures. In such a manner, they are distinguished.

Thus, the new type player and drive, which can deal with the optical disc according to the present invention and the conventional drive and player, which cannot deal with the optical disc according to the present invention can be distinguished in the number of reproducible contents, the qualities thereof, and added values thereof. In addition, the copyright of the content data can be protected.

Figure 16B:
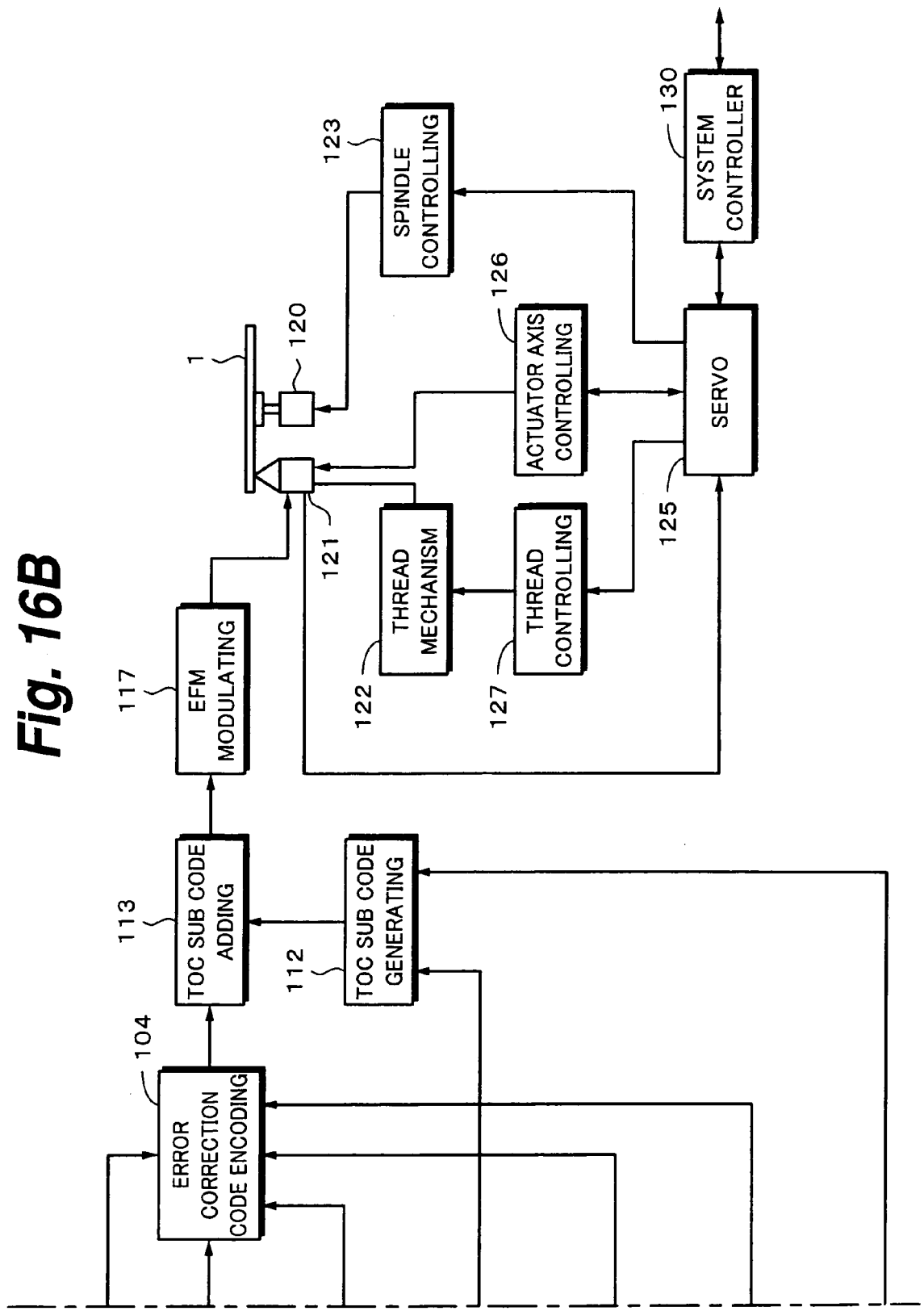

Next, a real structure of a recording apparatus will be described. In FIG. 16A and 16B, content data to be recorded in a program area PA1 is supplied to an input terminal 100. The content data is audio data that is the same as data corresponding to CD-DA standard. The content data supplied from the input terminal 100 is supplied to an error correction code encoding circuit 104.

Content data to be recorded in a program area PA2 is supplied to an input terminal 101. The content data is audio data compressed corresponding to a compressing system for example ATRAC3. The content data is supplied to an encrypting circuit 102.

The encrypting circuit 102 encrypts each piece of content data. Content key data KC1, KC2, . . . are supplied from a content key generating circuit 103 to the encrypting circuit 102. The content key generating circuit 103 generates the content key data KC1, KC2, . . . of the individual contents. The content data supplied from the input terminal 101 is encrypted with the content key data KC1, KC2, . . . supplied from the content key generating circuit 103. An output of the encrypting circuit 102 is supplied to the error correction code encoding circuit 104.

The content key data KC1, KC2, . . . generated by the content key generating circuit 103 are supplied to a key locker generating circuit 105A. In addition, the content key data KC1, KC2, . . . are supplied to a key locker generating circuit 105B. Copyright management information DRM1A, DRM2A, . . . and DRM1B, DRM2B, . . . are supplied from DRM generating circuits 106A and 106B to the key locker generating circuits 105A and 105B, respectively.

The DRM generating circuit 106A generates the copyright management information DRM1A, DRM2A, . . . to be contained in the key locker data K_LOCK1 recorded in the lead-in area LI2. The DRM generating circuit 106B generates the copyright management information DRM1B, DRM2B, . . . to be contained in the key locker data K_LOCK2 recorded in the program area PA2.

The key locker generating circuit 105A generates the key locker data K_LOCK1 recorded in the lead-in area LI2. The key locker data K_LOCK1 recorded in the lead-in area LI2 is supplied to an encrypting circuit 108A. Key locker key data KL1 is supplied from a hash calculating circuit 110A to the encrypting circuit 108A. The key locker key data KL1 is generated by a hash calculating circuit 119A. The hash calculating circuit 119A hash-calculates hidden key data KH1 supplied from a hidden key generating circuit 109A and the device key data KD. The encrypting circuit 108A encrypts the key locker data K_LOCK1. The key locker data K_LOCK1 encrypted by the encrypting circuit 108A is supplied to a TOC (Table Of Contents) sub code generating circuit 112. The hidden code key data KH1 supplied from the hidden key generating circuit 109A is supplied to the TOC sub code generating circuit 112.

The key locker generating circuit 105B generates the key locker data K_LOCK2 recorded in the program area PA2. Data of the key locker data K_LOCK2 recorded in the program area LI2 is supplied to the encrypting circuit 108B. The key locker key data KL2 is supplied from a hash calculating circuit 110B to the encrypting circuit 108B. The key locker key data KL2 is generated by a hash calculating circuit 119B. The hash calculating circuit 119B hash calculates the hidden key data KH2 supplied from a hidden key generating circuit 109B and device key data KD. The encrypting circuit 108B encrypts the key locker data K_LOCK2. The key locker data K_LOCK2 encrypted by the encrypting circuit 108B is supplied to the error correction code encoding circuit 104.

The hidden key data KH2 supplied from the hidden key generating circuit 109B is supplied to the error correction code encoding circuit 104. Application data of a software player SFT1 supplied from a software player generating circuit 118 is supplied to the error correction code encoding circuit 104.

The error correction code encoding circuit 104 performs an error correction code encoding process for content data with CIRC (Cross Interleave Reed-Solomon Code). An output of the error correction code encoding circuit 104 is supplied to a TOC sub code adding circuit 113. The TOC sub code adding circuit 113 adds TOC data and sub code data to the output of the error correction code encoding circuit 104.

An output of the TOC sub code adding circuit 113 is supplied to a modulating circuit 117. The modulating circuit 117 performs for example EFM (8 to 14 Modulation).

The optical disc 1 is placed on a turn table (not shown) and rotated by a spindle motor 120. The spindle motor 120 is driven by a spindle controlling circuit 123 under the control of a servo controlling circuit 125 so that the spindle motor 120 rotates at constant linear velocity (CLV) or constant angular velocity (CAV).

The servo controlling circuit 125 generates various servo drive signals of focus servo drive signal, tracking servo drive signal, thread servo drive signal, and spindle servo drive signal corresponding to a focus error signal, a tracking error signal, and an operation command issued from a system controller 130 and outputs the generated servo drive signals to an actuator controlling circuit 126 126, a thread controlling circuit 127, and the spindle controlling circuit 123.

An optical pickup 121 is a mechanism that condenses laser light of a semiconductor laser as a light source on a signal surface of the optical disc 1 and scans tracks concentrically or spirally formed on the optical disc 1. An objective lens that condenses the laser light of the optical pickup 121 on the signal surface of the optical disc 1 can be traveled in a focus direction and a tracking direction by an actuator (not shown). The actuator is controlled by an actuator controlling circuit 126 under the control of the servo controlling circuit 125. All the optical pickup 121 is traveled in the radius direction of the optical disc 1 by a thread mechanism 122. The traveling of the thread mechanism 122 is controlled by the thread controlling circuit 127 under the control of the servo controlling circuit 125.

Output data of the modulating circuit 117 is supplied to the optical pickup 121. The optical pickup 121 outputs laser light whose lighting wavelength has been modulated corresponding to the output data of the modulating circuit 117. The laser light lights the recording surface of the optical disc 1. As a result, information is recorded on the optical disc 1.

In the recording apparatus, when content data is recorded in the program area PA1, the content data supplied from the input terminal 100 is supplied to the error correction code encoding circuit 104. The error correction code encoding circuit 104 performs the error correction code encoding process for the content data.

The optical pickup 121 is traveled to the program area PA1. An output of the error correction code encoding circuit 104 is supplied to the modulating circuit 117. The content data supplied from the input terminal 100 is recorded in the program area PA1.

When content data is recorded in the program area PA2, the content data supplied from the input terminal 101 is encrypted by the encrypting circuit 102 and supplied to the error correction code encoding circuit 104. The error correction code encoding circuit 104 performs the error correction code encoding process for the content data.

The key locker generating circuit 105A generates the key locker data K_LOCK1 recorded in the lead-in area LI2. The key locker generating circuit 105B generates the key locker data K_LOCK2 recorded in the program area PA2.

The optical pickup 111 is traveled to the lead-in area LI2. The key locker data K_LOCK1 supplied from the key locker generating circuit 105A and recorded in the lead-in area LI2 is supplied to the TOC sub code generating circuit 112. The key locker data K_LOCK1 is recorded in the lead-in area LI2 of the optical disc 1.

The optical pickup 111 is traveled to the lead-in area LI2. The key locker data K_LOCK2 supplied from the key locker generating circuit 105B and recorded in the lead-in area LI2 is supplied to the error correction code encoding circuit 104. An output of the error correction code encoding circuit 104 is supplied to the modulating circuit 107. The key locker data K_LOCK2 is recorded in the program area PA2. Application data of a software player SFT1 supplied from a software player generating circuit 118 is sent to the error correction code encoding circuit 104. The application data of the software player SFT1 is recorded in the program area PA2.

Figure 17:
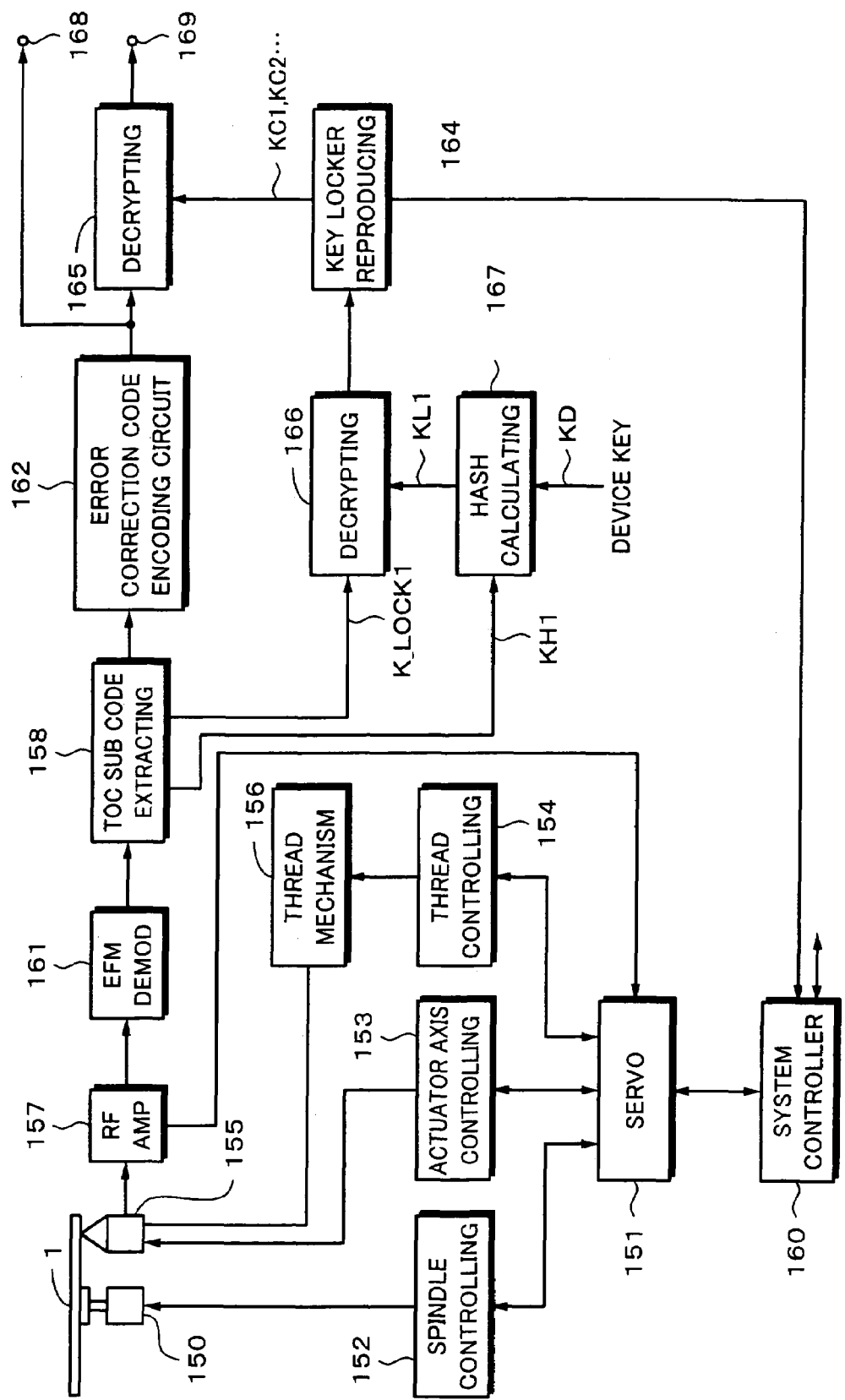
FIG. 17 is a block diagram showing an example of a reproducing apparatus for reproducing data from the optical disc according to an example of the present invention.

FIG. 17 shows a real structure of a reproducing apparatus that can deal with the optical disc 1 in the case that the reproducing apparatus reproduces data from the optical disc 1 according to the present invention.

In FIG. 17, the optical disc 1 is placed on a turn table (not shown) and rotated by a spindle motor 150. The spindle motor 150 is driven by a spindle controlling circuit 152 under the control of a servo controlling circuit 151 so that the spindle motor 150 rotates at constant linear velocity (CLV) or constant angular velocity (CAV).

The servo controlling circuit 151 generates various servo drive signals of focus servo drive signal, tracking servo drive signal, thread servo drive signal, and spindle servo drive signal corresponding to a focus error signal, a tracking error signal, and an operation command issued from a system controller 160 and outputs those signals to an actuator controlling circuit 153, a thread controlling circuit 154, and the spindle controlling circuit 152. An optical pickup 155 is a mechanism condenses laser light of a semiconductor laser as a light source on a signal surface of the optical disc 1 with an objective lens and scans tracks concentrically or spirally formed on the optical disc 1. All the optical pickup 155 is traveled in the radius direction of the optical disc 1 by a thread mechanism 156.

When the program area PA1 is reproduced, the optical pickup 155 is traveled to the program area PA1 of the optical disc 1 by the thread mechanism 156. The optical pickup 155 reads data from the program area PA1 of the optical disc 1. Content data in the same format as data corresponding to for example CD-DA standard is read from the program area PA1. An output signal of the optical pickup 155 is supplied to an error correction code decoding circuit 162 through an RF amplifier 157, an EFM demodulating circuit 161, and a TOC sub code extracting circuit 158. The error correction code decoding circuit 162 performs an error correcting process for the output signal of the optical pickup 155. An output of the error correction code decoding-circuit 162 is output from an output terminal 168.

When the program area PA2 is reproduced, the optical pickup 155 is traveled to the lead-in area LI2 by the thread mechanism 156. Key locker data K_LOCK1 is read from a lead-in area LI2. The key locker data K_LOCK1 is supplied from the TOC sub code extracting circuit 158 to a decrypting circuit 166. Hidden key data KH1 is read from the lead-in area LI2. The hidden key data KH1 is supplied from the TOC sub code extracting circuit 158 to a key locker key generating circuit 167. The key locker key generating circuit 167 generates key locker key data KL1 with device key data KD stored in the reproducing apparatus and the hidden key data KH1. The key locker key data KL1 is supplied to the decrypting circuit 166.

The decrypting circuit 166 decrypts the key locker data K_LOCK1 with the key locker key data KL1 supplied from the hash calculating circuit 167. An output of the decrypting circuit 166 is supplied to a key locker reproducing circuit 164. The key locker reproducing circuit 164 takes out content key data KC1, KC2, . . . from the reproduced key locker data K_LOCK1. The content key data KC1, KC2, . . . are supplied to a decrypting circuit 165.

The optical pickup 155 is traveled to the program area PA2 by the thread mechanism 156. Content data is read from the program area PA2. The content data in the program area PA2 has been compressed corresponding to for example ATRAC3 and encrypted. An output signal of the optical pickup 155 is supplied to the decrypting circuit 165 through the RF amplifier 157, the demodulating circuit 161, the TOC sub code extracting circuit 158, and the error correction code decoding circuit 162.

The content key data Kc1, KC2, . . . are supplied from the key locker reproducing circuit 164 to the decrypting circuit 165. The decrypting circuit 165 decrypts the content data with the content key data KC1, KC2, . . . supplied from the key locker reproducing circuit 164. The decrypted content data is output from an output terminal 169.

The key locker reproducing circuit 164 takes out copyright management information DRM1A, DRM2A, . . . from the key locker data K_LOCK1. The copyright management information DRM1A, DRM2A, . . . are supplied to the system controller 160. The system controller 160 determines the copyright management information DRM1A, DRM2A, . . . The system controller 160 performs reproduction restrictions and copy restrictions corresponding to the copyright management information DRM1A, DRM2A, . . .

Figure 18:
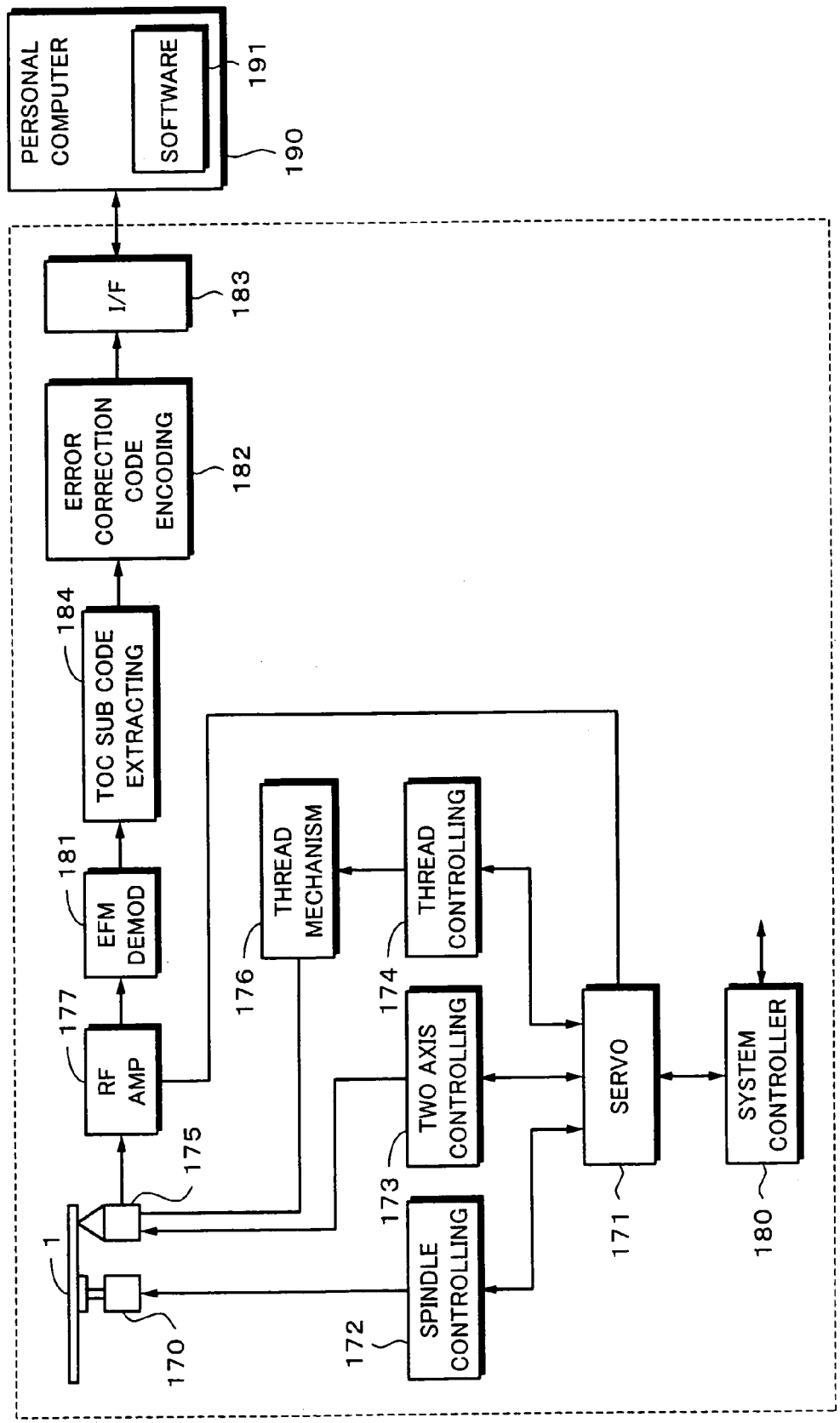
FIG. 18 is a block diagram showing another example of the reproducing apparatus for reproducing data from the optical disc according to an example of the present invention.

FIG. 18 shows a real structure of a reproducing apparatus that cannot deal with the optical disc 1 in the case that the reproducing apparatus reproduces data from the optical disc 1 according to the present invention.

In FIG. 18, the optical disc 1 is placed on a turn table (not shown) and rotated by a spindle motor 170. The spindle motor 170 is driven by a spindle controlling circuit 172 under the control of a servo controlling circuit 171 so that the spindle motor 170 rotates at constant linear velocity (CLV) or constant angular velocity (CAV).

The servo controlling circuit 171 generates various servo drive signals of focus servo drive signal, tracking drive signal, thread drive signal, and spindle drive signal corresponding to a focus error signal, a tracking error signal, and an operation command issued from a system controller 180 and outputs those signals to an actuator controlling circuit 173, a thread controlling circuit 174, and the spindle controlling circuit 172. An optical pickup 175 is a mechanism that condenses laser light of a semiconductor laser as a light source on a signal surface of the optical disc 1 with an objective lens and scans tracks concentrically or spirally formed on the optical disc 1. All the optical pickup 175 is traveled in the radius direction of the optical disc 1 by a thread mechanism 176.

An output signal of the optical pickup 175 is supplied to a demodulating circuit 181 through an RF amplifier 177. The demodulating circuit 181 EFM-demodulates the output signal of the optical pickup 175. Output data of the demodulating circuit 181 is supplied to an error correction code decoding circuit 182. The error correction code decoding circuit 182 performs an CIRC error correcting process.

When a program area PA1 is reproduced, the optical pickup 175 is traveled to the program area PA1 of the optical disc 1 by the thread mechanism 176. The optical pickup 175 reads data from the program area PA1 of the optical disc 1. Content data that has the same format as data corresponding to CD-DA standard is read from the program area PA1. An output signal of the optical pickup 175 is demodulated by the demodulating circuit 181. The demodulated signal is sent to a TOC sub code extracting circuit 184 and the error correction code demodulating circuit 182. The error correction code decoding circuit 182 performs an error correcting process. Output data of the error correction code decoding circuit 182 is output through an interface 183.

When content data is reproduced from the program area PA2, a decrypting process is performed by software 191 of a personal computer 190.

In other words, when the program area PA2 is reproduced, the optical pickup 175 is traveled to the program area PA2. Data of the software player SFT1 is read. The data of the software player SFT1 is supplied to the personal computer 190 through the demodulating circuit 181, the TOC sub code extracting circuit 184, the error correction code decoding circuit 182, and the interface 183.

Figure 19:
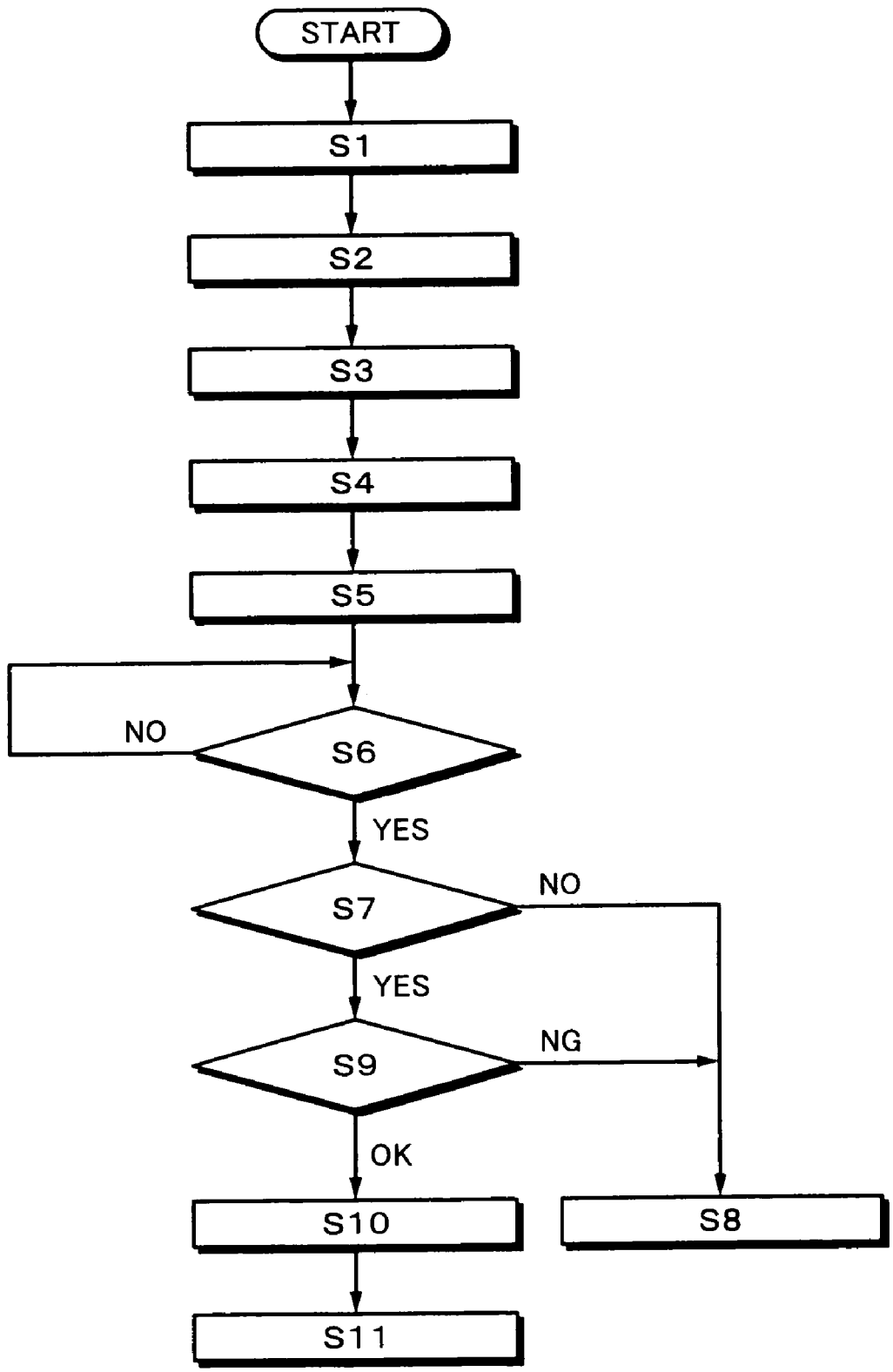
FIG. 19 is a flow chart for describing another example of the reproducing apparatus for reproducing data from the optical disc according to an example of the present invention.

As shown in FIG. 19, when the application of the software player is started (at step S1), hidden key data KH2 is read from the program area PA2 (at step S2). The hidden key data KH2 and device key data KD are calculated. As a result, key locker key data KL2 is generated (at step S3).

Key locker data K_LOCK2 is read from the program area PA2 (at step S4). Data of the key locker data K_LOCK2 that has been read is decrypted with the key locker key data KL2 generated at step S3. Content key data KC1, KC2, . . . and copyright management information DRM1B, DRM2B, . . . are taken out from the key locker data K_LOCK2 (at step S5).

It is determined whether or not a reproduction command has been issued (at step S6). When the reproduction command has been issued, it is determined whether or not content key data KC1, KC2, . . . with which content data corresponding to the reproduction command is decrypted are contained in content key data KC1, KC2, . . . of the key locker data K_LOCK2 taken out at step S5 (at step S7).

When it has been determined at step S7 that the content key data KC1, KC2, . . . with which the content data corresponding to the reproduction command is decrypted are contained, the flow advances to step S8. It is determined whether or not the content data corresponding to the reproduction command can be reproduced with the copyright management information DRM1B, DRM2B, . . . of the key locker data K_LOCK2 taken out at step S5 (at step S8).

When it has been determined at step S7 that the content key data KC1, KC2, . . . with which the content data corresponding to the reproduction command is decrypted are not contained, the reproducing operation is stopped (at step S8).

When it has been determined at step S8 that the content data corresponding to the reproduction command can be reproduced with the copyright management information DRM1B, DRM2B, . . . , the optical pickup 175 reads the content data from the program area PA2 (at step S9). With the content key data KC1, KC2, . . . taken out from the key locker data K_LOCK2 at step S5, the content data is decrypted (at step S10).

When it has been determined at step S8 that the content data corresponding to the reproduction command can be reproduced corresponding to the copyright management information DRM1B, DRM2B, . . . the reproducing operation is stopped (at step S8).

As shown in FIG. 17, when the drive and player that can deal with the optical disc 1 according to the present invention reproduce content data therefrom, the content data is decrypted with the content key data KC1, KC2, . . . stored in the key locker data K_LOCK1 in the lead-in area LI2. With the copyright management information DRM1A, DRM2A, . . . stored in the key locker data K_LOCK1 in the lead-in area LI2, the reproduction and copy of the content data are controlled.

In contrast, as shown in FIG. 18 and FIG. 19, when the conventional drive and player that cannot deal with the optical disc 1 reproduce content data therefrom, with the content key data KC1, KC2, . . . stored in the key locker data K_LOCK2 in the program area PA2, the content data is decrypted. With the copyright management information DRM1B, DRM2B, . . . stored in the key locker data K_LOCK2 in the program area PA2, the reproduction and copy of the content data are controlled.

As shown in FIG. 14 and FIG. 15, the number of content key data KC1, KC2, . . . of the key locker data K_LOCK1 in the high secrecy lead-in area LI2 is larger than the number of content key data KC1, KC2, . . . of the key locker data K_LOCK2 in the low secrecy program area PA2. In addition, the management conditions of the copyright management information DRM1A, DRM2A, . . . of the key locker data K_LOCK1 in the high secrecy lead-in area LI2 are more advantageous than the management conditions of the copyright management information DRM1B, DRM2B, . . . of the key locker data K_LOCK2 in the low secrecy program area PA2. In that case, the drive and player that can deal with the optical disc 1 can reproduce more music programs and have more added values than the conventional drive that cannot deal with the optical disc 1.

In the forgoing example, the optical disc is a two-session disc of which a conventional content data recording area is separated from encrypted content data recording area. Alternatively, the optical disc may be a one-session disc.

In addition, in the forgoing example, key locker data and hidden key data are recorded in a lead-in area and a program area. Alternatively, key locker data and hidden key data may be recorded in a lead-out area and a program area. Alternatively, key locker data and hidden key data may be recorded in a lead-in area, a lead-out area, a program area.

According to the present invention, the player and drive that can deal with the new type optical disc access a key locker recorded in the lead-in area and/or the lead-out area, obtain copyright management information and content key data, and reproduce content data. The player and drive that cannot deal with the new type optical disc access a key locker in the program area, obtain copyright management information and content key data, and reproduce content data.

A key locker recorded in the lead-in area and/or the lead-out area can be accessed by only the reproducing apparatus that can deal with the new type optical disc. A key locker in the program area can be accessed by the reproducing apparatus that cannot deal with the new type optical disc. Since the reproducing apparatus that can deal with the new type optical disc uses a key locker recorded in the lead-in area and/or the lead-out area, the secrecy is high. In contrast, since the reproducing apparatus that cannot deal with the new type optical disc uses a key locker recorded in the program area, the secrecy is not secured.

According to the present invention, the copyright management information and the content key data of the key locker recorded in the program area are smaller than those of the key locker recorded in the lead-in area and/or the lead-out area with respect to quantity and added values, the copyright can be protected. In addition, since the number of reproducible contents and qualities thereof reproduced by the reproducing apparatus that can deal with the new type optical disc are different from those reproduced by the reproducing apparatus that cannot deal with the new type optical disc, they can be distinguished. Thus, sales of the new type apparatus can be promoted. Industrial Utilization As described above, the present invention is suitable for a recording medium such as an optical disc for recording content data, a recording method and apparatus for recording content data on such a recording medium, and a reproducing method for reproducing content data.

The invention claimed is:

1. A recording medium, comprising:
a lead-in area;
a data recording area that is formed on an outer periphery side of the lead-in area and in which a plurality of pieces of content data is recorded; and
a lead-out area formed on an outer periphery side of the data recording area,
wherein first copyright management information and second copyright management information with which copyrights of the plurality of pieces of content data are managed are recorded at different positions whose secrecies are different from each other,
any one of first copyright management information and second copyright management information is recorded in any one of said lead-in area and said lead-out area, the other copyright management information being recorded in the data recording area, a position of said data recording area providing lower secrecy than any one of said lead-in area and said lead-out area, and
the first copyright management information and the second copyright management information are not related to encryption of the content data.

2. The recording medium as set forth in claim 1,
wherein the first copyright management information and the second copyright management information are copyright management information that are different from each other in management conditions under which the plurality of pieces of content data are reproduced.

3. The recording medium as set forth in claim 2,
wherein any one of the first copyright management information and the second copyright management information is management information that represents reproduction permissions of the plurality of pieces of content data, whereas the other copyright management information is management information that represents partial reproduction permissions of the plurality of pieces of content data.

4. The recording medium as set forth in claim 3,
wherein one of the first copyright management information and the second copyright management information is recorded in at least any one of the lead-in area and the lead-out area.

5. The recording medium as set forth in claim 4,
wherein the other copyright management information of the first copyright management information and the second copyright management information is recorded in the data recording area.

6. The recording medium as set forth in claim 1,
wherein any one of the first copyright management information and the second copyright management information is stricter in management conditions of the plurality of pieces of content data than the other copyright management information.

7. The recording medium as set forth in claim 1,
wherein any one of the first copyright management information and the second copyright management information is stricter in reproduction restriction conditions of the plurality of pieces of content data than the other copyright management information.

8. The recording medium as set forth in claim 7,
wherein any one of the first copyright management information and the second copyright management information contains copy prohibition conditions of the plurality of pieces of content data, whereas the other copyright management information contains copy permission conditions of the plurality of pieces of content data.

9. The recording medium as set forth in claim 8,
wherein the other copyright management information, which contains the copy permission conditions of the plurality of pieces of content data, is recorded in at least any one of the lead-in area and the lead-out area.

10. The recording medium as set forth in claim 8,
wherein one of the first copyright management information and the second copyright management information, which contains the copy prohibition conditions of the plurality of pieces of content data, is recorded in the data recording area.

11. The recording medium as set forth in claim 1,
wherein at least one of the plurality of pieces of content data recorded in the data recording area has been encrypted and recorded, and
wherein the first copyright management information and the second copyright management information are recorded along with key data with which the encrypted at least one of the plurality of pieces of content data is decrypted.

12. The recording medium as set forth in claim 11,
wherein the first copyright management information and the second copyright management information are encrypted and recorded along with the key data with which the encrypted at least one of the plurality of pieces of content data is decrypted.

13. The recording medium as set forth in claim 1, wherein the other copyright management information is used by a reproduction device when the reproduction device is not capable of reading the lead-in area, or the lead-out area, of the recording medium.

14. A recording method, comprising the steps of:
recording a plurality of pieces of content data to a recording medium; and
recording first copyright management information and second copyright management information with which copyrights of the plurality of pieces of content data are managed at different positions of the recording medium, secrecies of the different positions being different from each other, wherein
one of the first copyright management information and the second copyright management information is recorded in at least any one of a lead-in area that is formed on an inner periphery side of a recording area in which the plurality of pieces of content data are recorded and a lead-out area that is formed on an outer periphery side of the recording area, the other copyright management information is recorded in the recording area, a position of said data recording area providing lower secrecy than any one of said lead-in area and said lead-out area, and the first copyright management information and the second copyright management information are not related to encryption of the content data.

15. The recording method as set forth in claim 14, wherein the first copyright management information and the second copyright management information are copyright management information that are different from each other in management conditions under which the plurality of pieces of content data are reproduced.

16. The recording method as set forth in claim 15, wherein any one of the first copyright management information and the second copyright management information is management information that represents reproduction permissions of the plurality of pieces of content data, whereas the other copyright management information is management information that represents partial reproduction permissions of the plurality of pieces of content data.

17. The recording method as set forth in claim 14, wherein any one of the first copyright management information and the second copyright management information is stricter in management conditions of the plurality of pieces of content data than the other copyright management information.

18. The recording method as set forth in claim 14, wherein any one of the first copyright management information and the second copyright management information is stricter in reproduction restriction conditions of the plurality of pieces of content data than the other copyright management information.

19. The recording method as set forth in claim 18, wherein any one of the first copyright management information and the second copyright management information contains copy prohibition conditions of the plurality of pieces of content data, whereas the other copyright management information contains copy permission conditions of the plurality of pieces of content data.

20. The recording method as set forth in claim 19, wherein the other copyright management information, which contains the copy permission conditions of the plurality of pieces of content data, is recorded in at least any one of the lead-in area and the lead-out area.

21. The recording method as set forth in claim 19, wherein one of the first copyright management information and the second copyright management information, which contains the copy prohibition conditions of the plurality of pieces of content data, is recorded in the data recording area.

22. The recording method as set forth in claim 14, wherein at least one of the plurality of pieces of content data is encrypted and recorded, and wherein the first copyright management information and the second copyright management information are recorded along with key data with which the encrypted at least one of the plurality of pieces of content data is decrypted.

23. The recording method as set forth in claim 22, wherein the first copyright management information and the second copyright management information are encrypted and recorded along with the key data with which the encrypted at least one of the plurality of pieces of content data is decrypted.

24. The recording method as set forth in claim 14, further comprising:

recording data with respect to software for reading the other copyright management information in the recording area, in which the plurality of pieces of content data are recorded.

25. The recording method as set forth in claim 14, wherein the other copyright management information is used by a reproduction device when the reproduction device is not capable of reading the lead-in area, or the lead-out area, of the recording medium.

26. A recording medium recording apparatus, comprising:

a head portion for recording data to a recording medium;

an encode processing portion for performing an encoding process for data to be recorded and supplying the encoded data to the head portion; and a controlling portion for recording a plurality of pieces of content data to the recording medium and controlling the head portion so that it records first copyright management information and second copyright management information with which copyrights of the plurality of pieces of content data are managed to different positions of the recording medium, the secrecies of the different positions being different from each other, wherein the controlling portion is configured to perform a control so that one of the first copyright management information and the second copyright management information is recorded in at least any one of a lead-in area that is formed on an inner periphery side of a data recording area in which the plurality of pieces of content data are recorded and a lead-out area that is formed on an outer periphery side of the recording area, the controlling portion is configured to perform a control so that the other copyright management information is recorded in the recording area, a position of said data recording area providing lower secrecy than any one of said lead-in area and said lead-out area, and the first copyright management information and the second copyright management information are not related to encryption of the content data.

27. The recording medium recording apparatus as set forth in claim 26, wherein the first copyright management information and the second copyright management information are copyright management information that are different from each other in management conditions under which the plurality of pieces of content data are reproduced.

28. The recording medium recording apparatus as set forth in claim 27, wherein any one of the first copyright management information and the second copyright management information is management information that represents reproduction permissions of the plurality of pieces of content data, whereas the other copyright management information is management information that represents partial reproduction permissions of the plurality of pieces of content data.

29. The recording medium recording apparatus as set forth in claim 26, wherein any one of the first copyright management information and the second copyright management information is stricter in management conditions of the plurality of pieces of content data than the other copyright management information.

30. The recording medium recording apparatus as set forth in claim 26,
wherein any one of the first copyright management information and the second copyright management information is stricter in reproduction restriction conditions of the plurality of pieces of content data than the other copyright management information.

31. The recording medium recording apparatus as set forth in claim 30,
wherein any one of the first copyright management information and the second copyright management information contains copy prohibition conditions of the plurality of pieces of content data, whereas the other copyright management information contains copy permission conditions of the plurality of pieces of content data.

32. The recording medium recording apparatus as set forth in claim 31,
wherein the other copyright management information, which contains the copy permission conditions of the plurality of pieces of content data, is recorded in at least any one of the lead-in area and the lead-out area.

33. The recording medium recording apparatus as set forth in claim 31,
wherein one of the first copyright management information and the second copyright management information, which contains the copy prohibition conditions of the plurality of pieces of content data, is recorded in the data recording area.

34. The recording medium recording apparatus as set forth in claim 26,
wherein the controlling portion is configured to encrypt and record at least one of the plurality of pieces of content data and record the first copyright management information and the second copyright management information along with key data with which the encrypted at least one of the plurality of pieces of content data is decrypted.

35. The recording medium recording apparatus as set forth in claim 34,
wherein the controlling portion is configured to encrypt and record the first copyright management information and the second copyright management information along with the key data with which the encrypted at least one of the plurality of pieces of content data is decrypted.

36. The recording medium recording apparatus as set forth in claim 26, wherein the other copyright management information is used by a reproduction device when the reproduction device is not capable of reading the lead-in area, or the lead-out area, of the recording medium.

37. A recording medium reproducing method, comprising the steps of:
reading any one of first copyright management information and second copyright management information from a recording medium comprising a lead-in area, a data recording area that is formed on an outer periphery side of the lead-in area and in which a plurality of pieces of content data is recorded, and a lead-out area formed on an outer periphery side of the data recording area, wherein the first copyright management information and the second copyright management information with which copyrights of the plurality of pieces of content data are managed are recorded at different positions whose secrecies are different from each other; and
controlling at least a reproducing operation for content data that is read from the data recording area corresponding to the copyright management information that has been read, wherein
any one of the first copyright management information and the second copyright management information is recorded in any one of the lead-in area and the lead-out area, the other copyright management information being recorded in the data recording area, a position of said data recording area providing lower secrecy than any one of said lead-in area and said lead-out area, and
the first copyright management information and the second copyright management information are not related to encryption of the content data.

38. The recording medium reproducing method as set forth in claim 37, further comprising:
wherein data with respect to software for reading the other copyright management information is recorded on the recording medium, and
reading the other copyright management information, after the data with respect to the software is read.

39. The recording medium reproducing method as set forth in claim 37,
wherein the first copyright management information and the second copyright management information are copyright management information that are different from each other in management conditions under which the plurality of pieces of content data are reproduced.

40. The recording medium reproducing method as set forth in claim 39,
wherein any one of the first copyright management information and the second copyright management information is management information that represents reproduction permissions of the plurality of pieces of content data, whereas the other copyright management information is management information that represents partial reproduction permissions of the plurality of pieces of content data.

41. The recording medium reproducing method as set forth in claim 40,
wherein one of the first copyright management information and the second copyright management information is recorded in at least any one of the lead-in area and the lead-out area.

42. The recording medium reproducing method as set forth in claim 41,
wherein the other copyright management information of the first copyright management information and the second copyright management information is recorded in the data recording area.

43. The recording medium reproducing method as set forth in claim 37,
wherein any one of the first copyright management information and the second copyright management information is stricter in management conditions of the plurality of pieces of content data than the other copyright management information.

44. The recording medium reproducing method as set forth in claim 37,
wherein any one of the first copyright management information and the second copyright management information is stricter in reproduction restriction conditions of the plurality of pieces of content data than the other copyright management information.

45. The recording medium reproducing method as set forth in claim 37, further comprising:

wherein at least one of the plurality of pieces of content data recorded in the data recording area has been encrypted and recorded, wherein the first copyright management information and the second copyright management information along with key data with which the encrypted at least one of the plurality of pieces of the content data is decrypted, and decrypting the encrypted data with the key data read from the recording medium.

46. The recording medium reproducing method as set forth in claim 45, further comprising:

wherein the first copyright management information and the second copyright management information have been encrypted and recorded along with the key data with which the encrypted at least one of the plurality of pieces of content data is decrypted, wherein another key data with which encrypted data is decrypted has been recorded on the recording medium, and decrypting, with at least the other key data read from the recording medium, the first copyright management information, the second copyright management information, and the key data.

47. The recording medium reproducing method as set forth in claim 37, wherein the other copyright management information is used by a reproduction device when the reproduction device is not capable of reading the lead-in area, or the lead-out area, of the recording medium.

* * * * *